United States Patent [19]

Soltz et al.

[11] 4,168,524
[45] Sep. 18, 1979

[54] AIRBORNE SURVEYING APPARATUS AND METHOD

[75] Inventors: J. Arnold Soltz, Boston; Glenn Mamon, Chestnut Hill; William A. Drohan, Bedford, all of Mass.

[73] Assignee: The Charles Stark Draper Laboratory, Inc., Cambridge, Mass.

[21] Appl. No.: 837,869

[22] Filed: Sep. 29, 1977

[51] Int. Cl.[2] .......................... G06F 15/20; G01C 3/08
[52] U.S. Cl. ........................................ 364/456; 324/4; 356/5; 356/141; 364/454; 364/571
[58] Field of Search ............... 364/453, 454, 456, 571; 356/5, 141; 343/112 E, 5 CM; 324/4, 5

[56] References Cited

U.S. PATENT DOCUMENTS

| 3,350,548 | 10/1967 | Whitaker | 364/454 |
|---|---|---|---|
| 3,352,223 | 11/1967 | Garra | 356/5 |
| 3,491,228 | 1/1970 | Selvin | 364/453 |
| 3,504,182 | 3/1970 | Pizzurro et al. | 356/141 |
| 3,536,992 | 10/1970 | Jensen et al. | 324/4 |
| 3,680,958 | 8/1972 | Von Bose | 356/141 |
| 3,802,780 | 4/1974 | Helm et al. | 356/141 |
| 3,817,620 | 6/1974 | Suzaki et al. | 356/5 |
| 3,829,659 | 8/1974 | Margolis | 364/571 |
| 3,872,284 | 3/1975 | Seligman et al. | 364/453 |
| 3,897,150 | 7/1975 | Bridges et al. | 343/5 CM |
| 4,038,527 | 7/1977 | Brodie et al. | 364/453 |
| 4,070,674 | 1/1978 | Buell et al. | 364/453 |

OTHER PUBLICATIONS

Broxmeyer: Inertial Navigation Systems, McGraw-Hill Book Co., pp. 100-138 (Chapter 6).

Primary Examiner—Felix D. Gruber
Attorney, Agent, or Firm—Kenway & Jenney

[57] ABSTRACT

A method and apparatus for surveying ground terrain from an airborne vehicle is disclosed. According to the method and apparatus, an inertial measurement unit, a position tracking device, and a terrain altimeter are carried by the airborne vehicle in a known vector relationship to one another. The inertial measurement unit provides continuous accelerometer data from which a first determination of vehicle position can be made. Simultaneously, data from the tracking device representative of the position of the tracking device relative to cooperating reflection means on the ground, if within sight of the airborne vehicle, provides, in combination with gimbal angle sensor outputs from the inertial measurement unit, an independent determination of the position of the vehicle. The two position measurements, when available, are continuously compared in real time on board the vehicle and error corrections are generated therefrom by estimation theory. The generated error corrections are stored and updated in real time and error correction signals are preferably provided to at least the inertial measurement unit to correct errors due, for example, to drift in the unit. The airborne vehicle can thereby be out of sight of the cooperating reflection means for substantial time durations without substantially degrading the accuracy of the position information. Corrected positional information, which includes the generated error corrections, and the correlated output of the terrain altimeter are stored to provide a profile of the region over which the vehicle flies. In preferred embodiments of the invention, both the position tracking device and the terrain altimeter are laser devices.

30 Claims, 8 Drawing Figures

AIRBORNE SURVEYING APPARATUS AND METHOD

This invention relates to a method and apparatus for measuring and determining the position of an airborne vehicle and in particular to a method and apparatus for surveying the terrain automatically from an airborne vehicle to define its geometry.

BACKGROUND OF THE INVENTION

There exist throughout the United States, areas which have never been properly surveyed or profiled due to their remoteness from population centers, the relative inaccessibility of the areas, and/or a lack of money. In other areas of the country, resurveying or reprofiling of previously mapped areas is desirable to increase the accuracy and precision of or to update a previous mapping.

In each of these situations, surveying or profiling by traditional ground methods, that is, a ground survey using standard surveying equipment, may be either impractical due to the profile to the terrain or overly expensive and time consuming. Thus, for example, the terrain may be so rugged that it is too difficult or too large to be surveyed economically by traditional techniques.

It is therefore desirable to provide alternate methods and apparatus to the traditional ground survey profiling methods and apparatus hitherto known. One suggestion, (Svetlinchny, U.S. Pat. No. 3,741,653, issued June 26, 1973), has been to survey terrain from the air using laser tracking and scanning devices, secured in an airplane. The airplane flies a predetermined path while the laser trackers scan the ground and provide data describing the ground profile and airplane position. The data is stored on board the airplane for later ground processing and in some instances, preliminary on board processing may be performed. In general, the system requires (1) a range and angle tracking altimeter system (a scanning laser system) to determine the distance between the airplane and a sequence of scanned ground locations, and (2) at least two distance measurement devices (laser tracking systems) which provide aircraft distance to continuously tracked cooperative targets on the ground. The distance measurement devices supply data from which the position of the airplane can be calculated by triangulation.

More specifically, in operation, the prior art systems, which may not provide aircraft position information in real time, employ a first laser tracker to acquire one of the cooperating ground targets, and, while distance information is being provided from that target, a second laser tracker scans, locates, and tracks a second ground target. The distance from the tracker to the second ground target is then determined. By triangulation techniques, according to the Svetlinchny patent, using the angle between the pointing directions of the tracking devices, the position of the aircraft can be determined. Simultaneously, ground terrain range (and angle) information is gathered by a laser altimeter to determine the terrain profile. The terrain profile is also calculated by triangulation. In these prior art systems, as the aircraft begins to move out of sight of one of the cooperating ground targets, the laser tracker which had been following that target begins to search for and locates the next cooperative reflecting target and thereafter data from the third acquired target is used in combination with data from the second acquired target to determine the location of the aircraft by triangulation. As noted above, the laser altimeter provides the data necessary to complete the system.

It has also been suggested by Svetlinchny in U.S. Pat. No. 3,741,653, that it would be possible to use only one tracking device and one scanning laser altimeter in the terrain profiling system described above. While the exact operation of this particular configuration is not clearly provided in the reference, apparently the laser altimeter is designed to perform the dual functions of scanning the ground for cooperative targets and simultaneously recording altitude information. The various data are sorted out in an airborne computer. In operation, then, the laser tracker provides position data representing the range between the aircraft and a sequence of acquired cooperative reflecting targets on the ground. As the first target moves out of sight of the aircraft, the laser tracker switches to the next acquired target, its location having been previously determined by the laser altimeter scanning device. After acquiring the next reflecting target, the laser tracker again provides range information for triangulation determinations. During the time when the laser tracker is switching from one cooperating reflecting target to another, and only then, the airplane position may apparently be provided by a stable inertial platform. Thus there is available data from one source or another (but not both) to an onboard computer, to compute aircraft position.

The prior art systems are thus able to provide the necessary aircraft position information so long as the aircraft is within sight of at least one reflecting cooperating target, and may provide the required information even for a short time if a cooperating target is not being tracked, by using an inertial platform as the data source. Such prior systems are however severely limited because of errors which exist and grow in the inertial data. These errors may result from drifts in the measuring equipment, mechanical alignment errors, etc. In particular, the characteristics of the short term errors in the data from an inertial platform are not well known and may, very quickly, on the order of seconds, grow so that the position information provided by the inertial platform is inaccurate. As a result, performance of the prior art systems is limited and the accurately surveyed ground cooperating targets should be provided relatively close together so that the aircraft is never out of sight of all ground targets. This may be a difficult requirement to fulfill however because of the time and money required to properly position and survey a large number of cooperating targets; however, the prior art really provides no practical alternatives, because, if the aircraft loses sight of all ground targets, for a sufficiently long time duration (say 10 seconds), the cumulative errors in the prior art tracking systems will exceed the accuracy expected in high precision maps (about 10 feet in the horizontal).

The prior art aerial surveying or profiling systems are also severely limited because they cannot operate in real time and must perform substantially all of the final map determinations on the ground. Because of the large amount of data which is typically collected during a surveying run, the ground data analysis thereby tends to take an undesirably long time and money.

it is therefore an object of this invention to provide an airborne surveying apparatus and method which is capable of maintaining a specified high positional accuracy during aerial profiling even though the airborne vehicle is out of sight of all surveyed cooperative targets for a sustained time duration. Other objects of the invention are to provide an apparatus and method which is simple to operate, which can quickly and accurately survey large areas of terrain, which is reliable, and which does not require the relatively close placement of cooperating reflecting ground targets.

Further objects of the invention are to provide a method and apparatus which generates and provides error correction signals to an inertial position determining system in order to provide more accurate position location data and to perform substantially all calculations in real time thereby significantly reducing data storage requirements and the costs of post-processing the data. Yet other objects of the invention are to provide an aerial surveying apparatus and method having the capability of providing vertical coordinate information accurate to within plus or minus one-half foot, horizontal coordinate information accurate to within plus or minus ten feet, and to provide the information (assuming that the errors can be characterized by a normal distribution) within these specified limits 95% of the time.

SUMMARY OF THE INVENTION

The apparatus for surveying ground terrain from an airborne vehicle features an inertial measurement unit, a position tracking device, a terrain altimeter, and a data processing and control unit each being carried by the airborne vehicle.

The inertial measurement unit (IMU) has a stable platform member on which are mounted at least three accelerometers. The accelerometers each provide an accelerometer output signal which together fully describe the accelerations to which the accelerometers are subjected. The accelerometer output signals hence describe the acceleration to which the platform is subjected. The inertial measurement unit further has a gimbal support means for supporting the platform and for providing gimbal angle measurements to fully describe the angular orientation of the stable platform relative to a predetermined platform reference direction fixed to the airborne vehicle. The gimbal support means also includes gimbal drive means to change the angular position of the corresponding gimbals. The platform further has mounted thereon at least three gyros having output signals responsive to deviations of the platform from a desired pointing direction. Means responsive to the gyro outputs are provided for driving the gimbal drive members to maintain the stable platform to the desired pointing direction.

The position tracking device provides tracker output signals representative of measured vector distances between the tracking device position and a cooperating reflection means on the terrain. The vector distances are provided in a predetermined tracker coordinate system affixed to the airborne vehicle.

The terrain altimeter provides altimeter output signals that are representative, in a predetermined altimeter coordinate system affixed to the aircraft, of measured vector distances between the altimeter and terrain locations at which the altimeter is directed.

The data processing and control unit is connected (a) to the inertial measurement unit for receiving the accelerometer output signals and the gimbal angle measurements, (b) to the position tracking device for receiving the tracker output signals, and (c) to the terrain altimeter for receiving the altimeter output signals. The data processing and control unit includes an accelerometer data processing means to determine from the accelerometer output signals, a sequence of inertial measurement unit determined positions, representing the position of the airborne vehicle at each of a sequence of known times and in a known coordinate system. The control unit further includes a tracker data processing means responsive to the tracker output signals and to the IMU gimbal angle measurements to determine a sequence of tracker determined positions representing the position of the airborne vehicle at each of the sequence of known times and in the known coordinate system.

The data processing and control unit also includes an error correction means responsive to the accelerometer data processing means and the tracker data processing means for generating error corrections for a plurality of the operating parameters of the inertial measurement unit and the position tracking device. Thereby, the inertial measurement unit determined positions (and the tracker determined positions) are corrected in real time.

In preferred embodiments of the invention, the position tracking device comprises a single laser tracker transmitter and an optical receiver for supplying the tracker output signals. Also, the control unit preferably further includes error feedback means for generating from the error corrections at least one error correction signal and for applying said one correction signal to the inertial measurement unit. The laser tracker may be suspended in a gimbal structure, the outer, and perhaps only, gimbal of which is supported by the airborne vehicle.

The cooperating reflection means, in a preferred embodiment, are retroreflectors, number at least three, and are not positioned along a straight line.

In another aspect of a particular embodiment of the invention, the error correction means includes differencing means responsive to the accelerometer data processing means and the tracker data processing means for differencing corresponding measurements of the sequence of inertial measurement unit determined positions and tracker determined positions to produce a sequence of output difference positions, and estimation means responsive to the sequence of difference positions to generate the error corrections. The estimation means may include for example means to perform Kalman filtering upon the sequence of difference positions to generate best estimates of the errors in the plurality of operating parameters of the inertial measurement unit and position tracking device. In another embodiment, the estimation means may perform batch least-squares error estimation.

The surveying method for providing a profile of an area of terrain from an airborne vehicle according to the invention features the steps of precisely determining the position of each of at least one cooperating reflecting devices on the terrain to be surveyed in a known coordinate system; initializing an inertial measurement unit having a stable inertial platform; maintaining the platform in a fixed orientation in the known coordinate system; flying the airborne vehicle over the terrain to be surveyed; determining repeatedly the position of the vehicle from data supplied by the inertial measurement unit; measuring repeatedly, using a single position tracking device, the distance and direction of the airborne vehicle from one of the reflecting devices during time durations when the reflecting means is within sight of the vehicle; synchronizing the distance and direction measurements to times coincident to the inertial measurement unit position determinations; determining repeatedly the position of the vehicle in the known coordinate system using the coincident distance and direction measurements; generating from the two sequences of vehicle position determinations, a sequence of error corrections for a plurality of the operating parameters of the inertial measurement unit and the position tracking device; storing said sequence of error corrections; using said sequence of error corrections to change said position determinations; and determining repeatedly the altitude of the airborne vehicle above the terrain at said coincident times using a measuring altimeter.

In particular embodiments of the invention, the method features the step of placing at least three of the cooperating reflecting devices not in a straight line. The method further features the steps of flying out of sight of all of the cooperating reflecting devices for a predetermined maximum time, and determining aircraft position solely from data supplied by the inertial measurement unit.

DESCRIPTION OF THE DRAWINGS

Other objects, features, and advantages of the invention will appear from the following description of a preferred embodiment taken together with the drawings in which.

DESCRIPTION OF A PREFERRED EMBODIMENT

Figure 1:
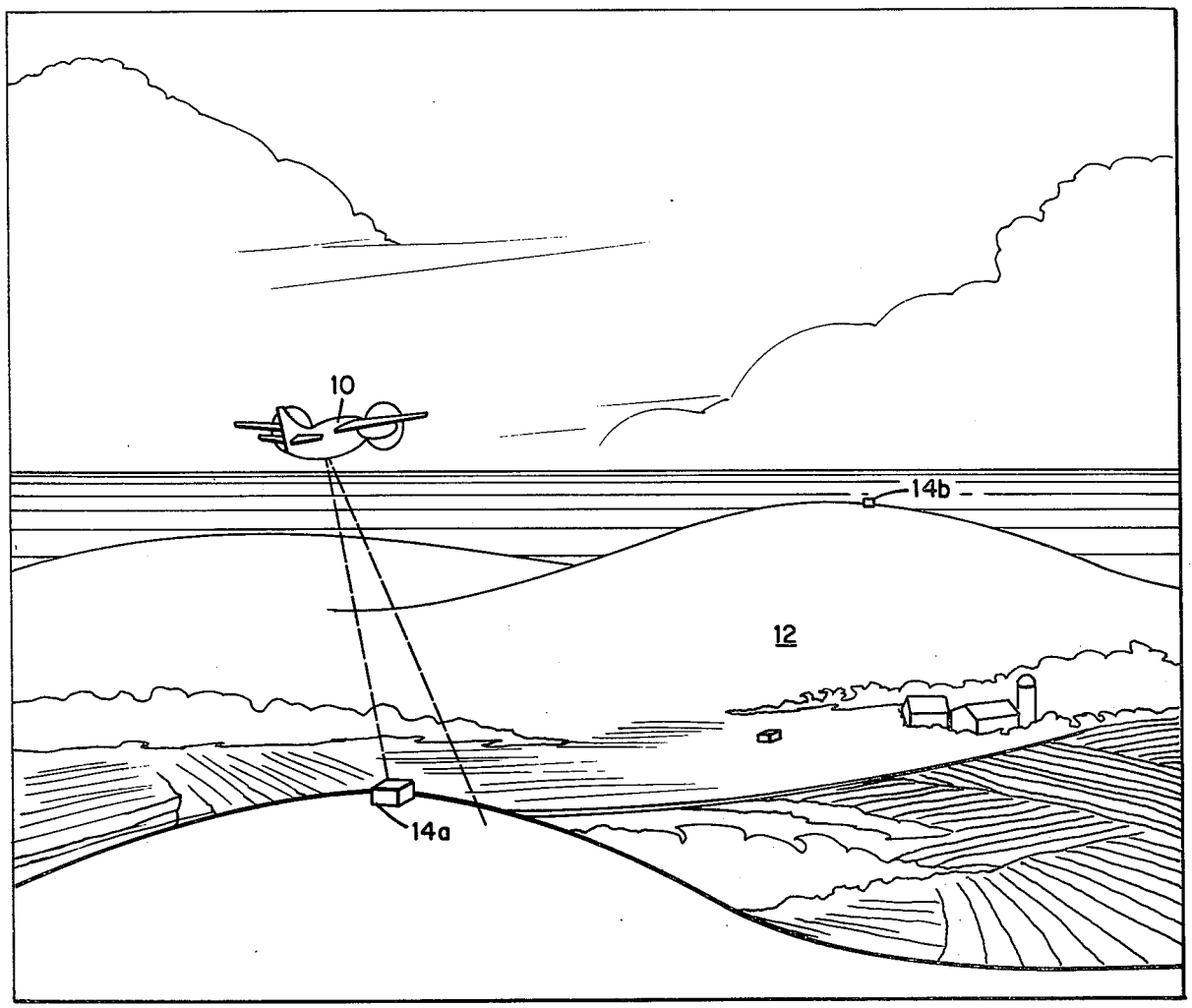
FIG. 1 is a perspective view showing schematically the airborne vehicle above a terrain to be surveyed.

Referring to FIG. 1, an airborne vehicle 10, typically a relatively slow, two engined, propeller driven airplane having a cruising speed of approximately 175-200 feet per second, carries apparatus to provide an aerial survey of a terrain 12 to be profiled. The terrain 12 may comprise mountains, valleys, areas of dense foliage, areas of light or no foliage, water bodies, buildings, etc.

The apparatus and method of the present invention relate to precisely determining the location or position of the airborne vehicle, substantially in real time and in a known coorindate system, so that errors, if any, in determining the position of the airborne vehicle may be either eliminated from or compensated for in the raw data. Another aspect of aerial surveying is to determine, within prescribed limits, the height of the airborne vehicle or aircraft above the terrain at each determined aircraft position. The second aspect of aerial surveying is dealt with in copending application Ser. No. 808,461, entitled Rangefinding System, filed on June 21, 1977, and whose disclosure is incorporated herein by reference.

According to the invention, an inertial measurement unit and a position tracking device are operated simultaneously to continuously provide, during significant portions of the aerial survey, sufficient data for two substantially independent determinations of aircraft position. The data is processed, substantially in real time, to produce "best estimates" of aircraft position and of errors in the measuring system, if any. The system may thereby be compensated in real time to correct the raw data and/or the raw data may be corrected during processing whereby the apparatus accurately and repeatedly determines the airborne vehicle position within required limits. An altimeter system provides data to repeatedly determine the height of the airborne vehicle above the terrain as discussed in and using the principles described in the copending application Ser. No. 808,461 referred to above and incorporated herein by reference.

The accuracy of the data provided by the inertial measurement unit depends upon the precision and sophistication of the unit; and the accuracy of the data from the position tracking device depends upon the precision built into that device. There results therefore a trade off between accuracy of the position determinations and the cost of building the system. (This assumes that the required technology is available). This invention describes and claims a method and apparatus which use sophisticated equipment operating in a complimentary manner to provide at least about an order of magnitude better positional accuracy than the same equipment operating independently under the same conditions.

In the usual instance, and in the preferred embodiment of the invention, the ground references comprise a plurality of cooperating reflecting means or devices 14 (14a, 14b, . . . ) provided at positionally known or surveyed locations on the ground surface, that is, locations whose position can be or has been surveyed to within a required limit, preferably within a few inches, in a known coordinate system. Thus, a device 14 may have been "walked in", i.e., precisely surveyed and placed at convenient locations in preparation for the aerial survey or the device may be placed at locations whose precise coordinate positions were already known. The devices 14 are most often retroreflectors, as are well known in the art, and shall hereinafter be referred to as retroreflectors. They may also be however any other type of device useful in reflecting a beamed signal back in precisely the direction from which it came. The retroreflectors are preferably placed at prominent locations on the ground and in the preferred embodiment of the invention, at least three retroreflectors are used, the three retroreflectors not being colinear.

Figure 2:
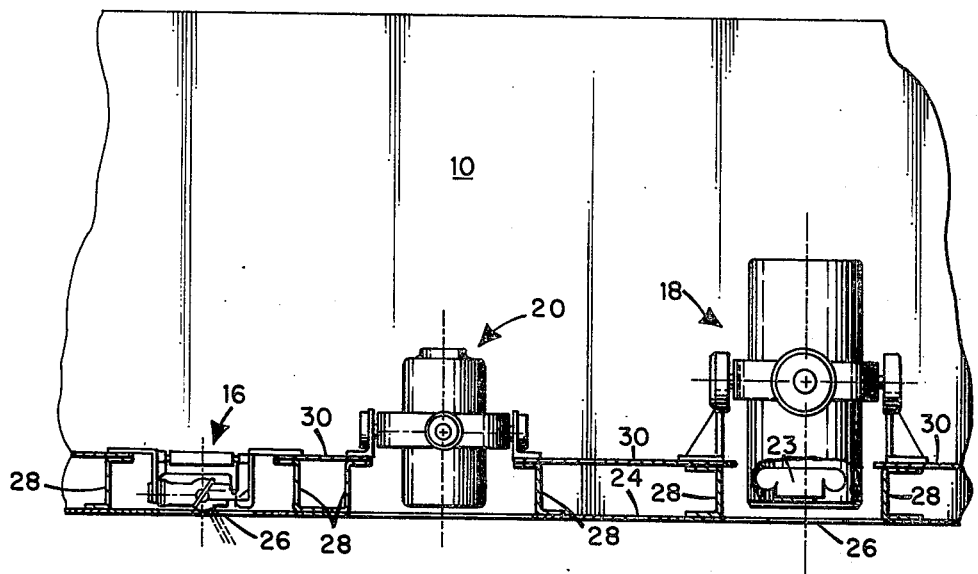
FIG. 2 is an elevation block schematic of a portion of the interior of the airborne vehicle according to the invention.
Figure 5:
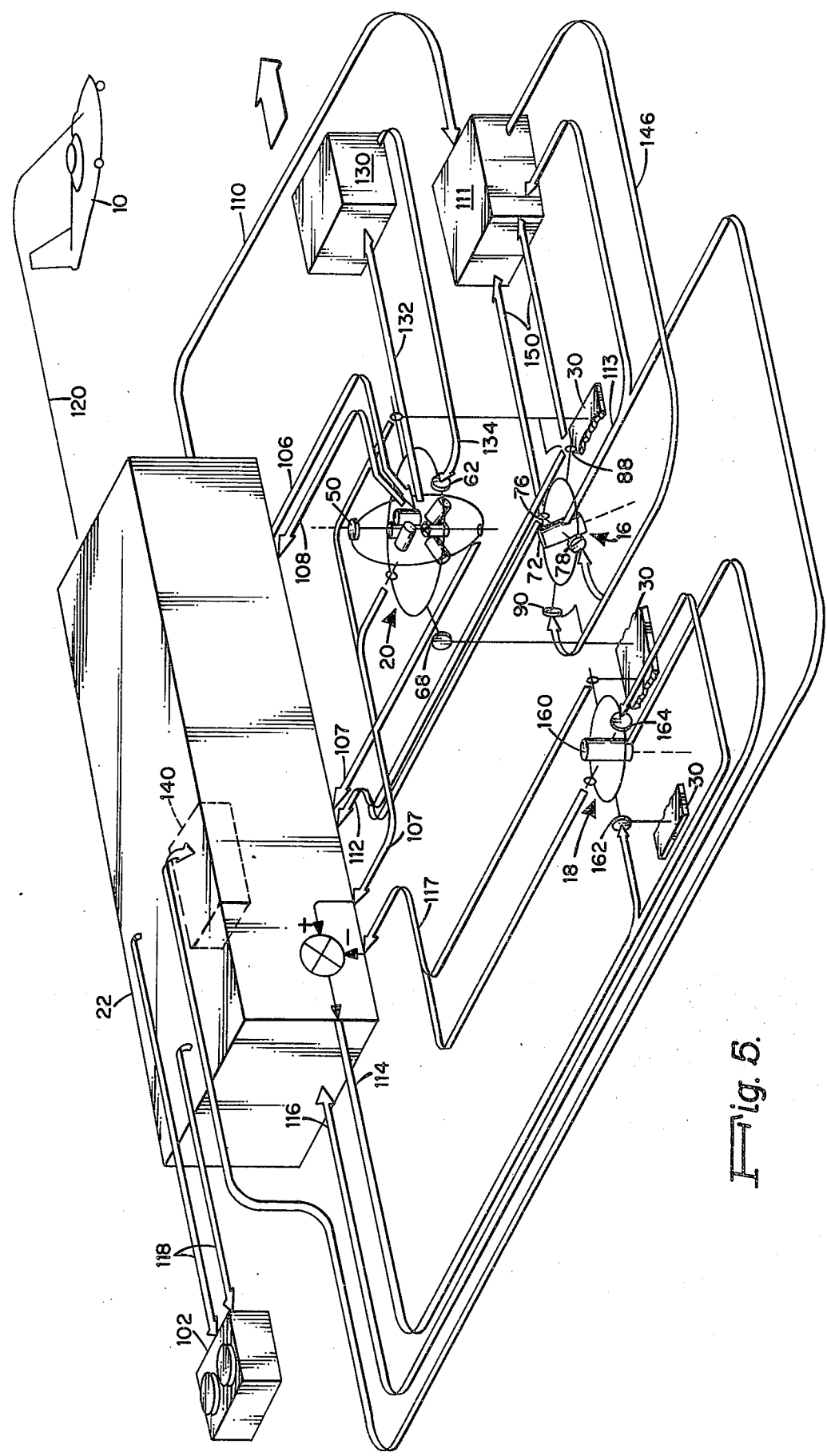
FIG. 5 is a schematic block diagram of the electrical signal information flow paths in the surveying system according to the invention.

Referring to FIG. 2, the main components of the surveying apparatus carried on board the airborne vehicle are a position tracking device, preferably a two axis gimballed laser tracker 16, a terrain altimeter system preferably a two axis gimballed laser altimeter 18, an inertial measurement unit 20, and a data processing and control unit 22 (FIG. 5). Briefly, the system, according to the preferred method, operates as follows.

The airborne vehicle flies a predetermined pattern which takes the aircraft over the terrain to be surveyed at least twice. In this manner, a preliminary "calibration run" is made prior to starting a "survey run" during which detailed data describing the profile of the terrain is recorded. During the "calibration run", which preferably includes two passes over the terrain, errors in the various data providing systems are estimated, error corrections are stored and updated, and in some instances the errors are preferably mechanically and automatically corrected by signals applied from the control unit. In this manner real time or substantially real time calculations may be made, with a relatively modest computing capability, with the result that significantly less data need be stored for later ground processing. The significant reduction in stored data results from the difference between storing the "raw" (but prefiltered) range and angle data at between about 12.5 and 25 samples per second per measurement (a total of twelve measurements, as described below) and storing the corrected and processed position data at between about 12.5 and 25 samples per second but now comprising only three data samples in a convenient geodetic system.

While the inertial measurement unit provides data during the entire flight, it is just prior to beginning of a run, for example the "survey run", that the laser tracker 16 acquires, fixes on, and tracks a first retroreflector which is in sight of the airborne vehicle. "In sight", in the context of the airborne surveying system, refers to the ability of the laser tracker to direct its transmitting laser at the retroreflector. In the preferred embodiment of the invention, the laser tracker is limited to a slant angle of about 60° to the vertical and hence for an aircraft flying at 3000 feet, "in sight", would require being within a circle whose radius was about 5196 feet. As the first retroreflector disappears from sight, the laser tracker 16 acquires and tracks each next retroreflector in sequence. The outputs from the tracking device simultaneously provide signals representing the vector distance in a predetermined tracker coordinate system affixed to the aircraft. Simultaneously, the laser altimeter 18 provides output data signals which represent repeated measurements of the position of the airborne vehicle above the terrain. Specifically, the laser altimeter provides output signals representing the vector distance in a predetermined altimeter coordinate system affixed to the aircraft.

The data from the laser tracker 16, the inertial measurement unit 20 and the laser altimeter 18 are processed on board the airborne vehicle by data processing and control unit 22. (Control unit 22 also controls to some degree, as described in detail below, pointing of tracking device 16 and altimeter 18 and the orientation of the inertial measurement unit.) Error corrections, if any, are repeatedly generated and at least one error correction signal is preferably provided to control and correct the error associated with one parameter of the inertial measurement unit 20. Preferably also, an error correction signal is provided to correct the error of at least one parameter of the laser tracker 16 thereby at least partially correcting one or more of the output data signals. There results a determination of the position of the airborne vehicle accurate to within predefined limits of the system even if the aircraft is out of sight of the retroreflectors for a substantial (predetermined maximum) time duration.

Although there are substantially two independent measurement systems carried by the aircraft, it is the inertial measurement unit which provides the capability of flying out of sight of all retroreflectors for substantial time durations, which, depending upon the specific inertial measurement unit, may be 200 seconds or more. During this time duration, the position of the airborne vehicle is determined solely from data generated by the inertial measurement unit. However it is the quality and stability of the inertial measurement unit, in combination with the error corrections generated by the data processing and control unit 22 (both during the time durations when the retroreflectors are being tracked and even when they are not being tracked), which determine the maximum time duration that the airborne vehicle may accurately survey the terrain while out of sight of all retroreflectors and which provide a degree of accuracy unavailable from the same inertial measurement unit operating by itself.

When the airborne vehicle, after losing sight of all retroreflectors, thereafter comes within sight of a retroreflector, for example retroreflector 14a (FIG. 1), the laser tracker 16 will acquire and track that retroreflector and again provide position data to provide an independent determination of the position of the aircraft.

Referring again to FIG. 2, in a typical hardware configuration, the inertial measurement unit 20, the laser tracker 16, and the laser altimeter 18 (having a small camera 23) are each secured to and fixed in relation to the bottom of the fuselage 24 of airborne vehicle 10. Alternatively, the laser tracker 16 could, for example, be supported by the inertial measurement system in a known relationship. The laser tracker 16 and the laser altimeter 18 each "see" through holes provided in the bottom of the aircraft fuselage. In other embodiments of the invention, transparent panels may be used provided that they do not cause excessive distortion. The inertial measurement unit, the laser tracker, and the laser altimeter are each positioned and supported, in the preferred embodiment, by supporting brackets 28 and horizontal support members 30 secured to the fuselage.

Figure 3:
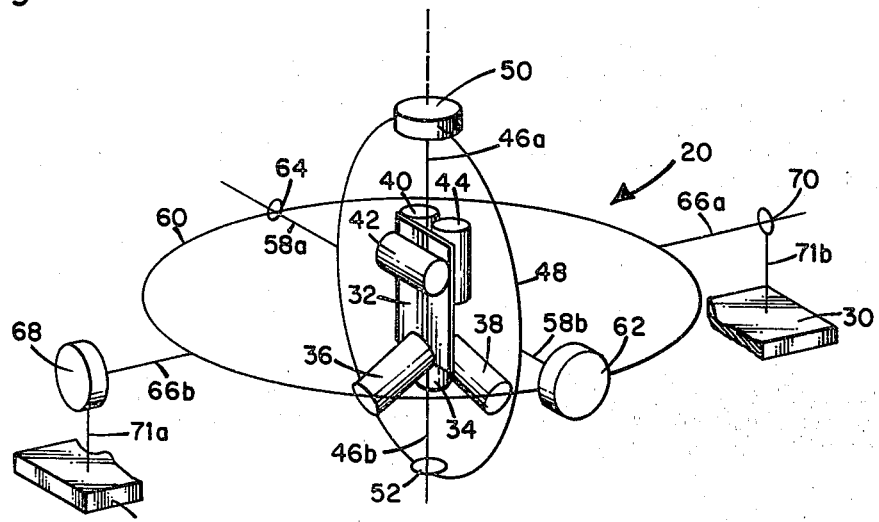
FIG. 3 is a more detailed schematic drawing of the inertial measurement unit according to the invention.

Referring to FIG. 3, the inertial measurement unit 20, in the preferred embodiment, comprises a three axis, gimballed, stable inertial platform member 32 on which are mounted three accelerometers 34, 36, 38 and three gyros 40, 42, 44. The gyros are preferably aligned respectively with the three coordinate axes (preferably orthogonal) defining the coordinate system in which the platform is maintained in a predetermined vector alignment (to a platform pointing direction). The accelerometers are preferably aligned in an orthogonal triad so that they are each equally affected by the acceleration due to gravity. The stable platform is connected by vertical axis shafts 46a, 46b to inner gimbal member 48. The connection is made through an azimuth drive member 50 and a bearing and angle sensing member 52. Inner gimbal member 48 is in turn connected by pitch axis shafts 58a, 58b to outer gimbal member 60 through a pitch drive member 62 and a second bearing and angle sensing member 64. Outer gimbal 60 is connected to the aircraft structure through roll axis shafts 66a, 66b. Shafts 66a, 66b are connected through a roll drive member 68, a third bearing and angle sensing member 70 and support elements 71a, 71b to support members 30. Thus the orientation of the stable platform can be directly related to a vector fixed with respect to the airborne vehicle (the platform reference direction).

Figure 4:
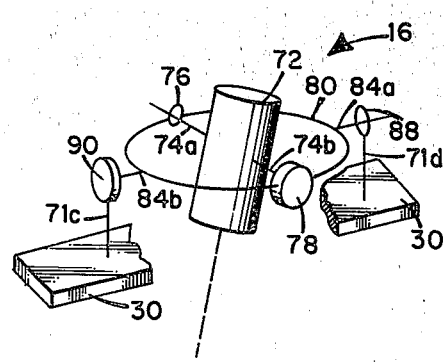
FIG. 4 is a more detailed schematic drawing of the position tracking device according to the invention.

Referring now to FIG. 4, the laser tracker of the preferred embodiment is supported above support members 30 in a gimbal structure by support elements 71c and 71d. The laser tracker comprises a laser transmitter and optical receiver device 72 substantially identical to that used in connection with the terrain altimeter. Device 72 is secured to tracker inner shafts 74a, 74b through a bearing and angle sensing member 76 and inner tracker drive member 78 attached to a tracker inner gimbal 80. The tracker inner gimbal 80 is supported by support elements 71c, 71d through tracker outer shafts 84a, 84b which are mounted in bearing and angle sensing member 88 on the one side and an outer tracker drive member 90 on the other. Thus, the orientation of the laser tracker 16, and in particular of device 72, is measured in a predetermined tracker coordinate system which in the preferred embodiment is fixed with respect to the aircraft. Therefore, the gimbal angle sensor outputs of the inertial measurement unit can be used to directly relate, by a linear transformation, the tracker angle output to the orientation of stable inertial platform 32 in its known coordinate system. Hence the range and measured or sensed angle outputs of the laser tracker (and gimbal angle outputs of the inertial measurement unit) can and do directly provide a measure of vehicle position relative to a retroreflector which can be and is compared (as described below) with the vehicle position output determined by the accelerometer data output of the inertial measurement unit 20.

Referring to FIG. 5, the inertial measurement unit 20, the laser tracker 16, and the laser altimeter 18 are electrically connected to the data processing and control unit 22 which processes the outputs of the various systems, estimates and internally stores and updates error corrections for a plurality of selected system parameters, and provides control signals to facilitate accurate alignment of the tracker and altimeter. In addition, in the preferred embodiment, at least some error correction signals are generated and used to mechanically or physically correct at least one parameter of the inertial measurement unit 20 and preferably also elements of the laser tracker 16 in order to provide a "best" real time estimate of aircraft position. The data processed by the control unit 22, which may include, for example, estimated aircraft position, smoothed and formatted laser altimeter data, error correction data, etc., is stored in a peripheral data storage device 102, for example a magnetic tape unit.

There are interconnections between the control unit 22 and each measurement source. Thus, there are provided (a) electrical signal paths 106, to the inertial measurement unit (IMU) from the data processing and control unit 22, (b) electrical signal paths 107 and 108 from the IMU to the control unit 22, (c) electrical signal paths 110 to a laser tracker control system 111 from the control unit 22, (d) electrical signal paths 112, 113 from the laser tracker to the control unit 22, (e) electrical signal paths 114 to the laser altimeter from the control unit 22, and (f) electrical signal paths 116, 117 from the laser altimeter to the control unit 22. As noted above, control unit 22 also provides outputs to the data storage device 102 over lines 118 and in the preferred embodiment of the invention, control unit 22 provides autopilot steering commands to an autopilot over lines 120.

The electrical signals passing from the inertial measurement unit 20 to the data processing and control unit 22 (represented schematically by signal paths 107, 108) provide the control unit 22 with complete data information (over line 107) regarding the orientation of the inertial measurement unit gimbals and with complete acceleration information from the accelerometers (over lines 108) regarding the accelerations to which the stable platform 32 is subjected. (Some IMU's provide directly the acceleration data and position and velocity data.) The control unit 22 in turn may provide gyro torquing drive signals to the IMU (over lines 106) to correct errors in gyros 40, 42, 44 and to compensate the gyros, if necessary, to maintain proper orientation of the inertial platform in the inertial coordinate system being used. Thus, in the preferred embodiment a locally level coordinate system is preferred because two of the accelerometers are independent of the effect of gravity. Then, drive signals over lines 106, compensate, for example, for the rotation of the earth. The inertial measurement unit is also responsive to a servomechanism control device 130. The servomechanism control device 130 is responsive to gyro signal outputs over lines 132 and provides (over lines 134), as is well known and conventional in the art, inertial measurement unit torque motor drive signals to maintain the orientation of stable platform 32 by changing the gimbal orientation through drive members 50, 62, and 68.

Similarly, the electrical signals from the laser tracker to the data processing and control unit 22 (which are represented schematically by signals over signal paths 112 and 113) provide the control unit with tracker angle sensor output data (over paths 112) representing the angles at which each of the axes of the laser tracker have been positioned and with signal data information (over line 113) indicative of the range from the laser tracker to a cooperating ground retroreflector. The signal data over line 113 is processed in the control unit 22 by a tracker range data processor 140 which provides the processed range data to another element of the control unit 22. For convenience processor 140 is shown as integral with control unit 22; however, it may also be excluded, if desired, and separate from of unit 22. The tracker drive members 78, 90 respond to tracker torque motor drive signals over a line 146 from the laser tracker servo control 111 as is conventional in the art. The signals over line 146 are applied to drive members 78 and 90 of the laser tracker 16 to change the orientation of the laser tracker transmitter/receiver unit 72. The laser tracker servo control 111 is responsive to the outputs of the laser tracker angle sensors over lines 150 (these same inputs are provided to the control unit over lines 112), to the signal data information from the control unit 22 over line 110, and to the range output of the laser optical receiver over lines 113 as described below.

Laser device 72 preferably includes a narrow beam laser transmitter whose output energy can be directed as required in response to commands generated by tracker servo 111. Such systems are well known in the art. The ground reflected return signal is preferably received by a four quadrant photodiode detector, as is also well known in the art. The photodetector outputs provide the signal levels over lines 113 which, as an input to tracker servo 148, provide accurate data information to point the device 72 toward and to track the retroreflector. As an input to processor 140, photodiode outputs enable the range from the retroreflector to the aircraft to be determined in a manner similar to that used in connection with laser altimeter 18.

The terrain altimeter 18 in the preferred embodiment of the invention, also includes a laser transmitter and optical receiver 160. The range output of the altimeter over line 116 is processed by control unit 22 substantially as described in U.S. Ser. No. 808,461, referred to above, and the altitude of the aircraft is thereby determined. The transmitter/receiver is maintained in a vertical orientation in this embodiment by the altimeter torque motor drive signals from the control unit 22 to the altimeter over lines 114. The vertical orientation is maintained by continuously comparing the outputs of the altimeter angle sensors over lines 117 with the outputs of IMU angle sensors over lines 107. The difference between the angles sensed over lines 107 and 117 provides a measure of the required angle correction and is used to drive altimeter gimbal drive members 162, 164 over lines 114. The operation of the laser altimeter 18 and processing of its range output signal are described in greater detail in U.S. application Ser. No. 808,461, filed on June 21, 1977. As noted above, U.S. Ser. No. 808,461 is incorporated herein by reference.

The data processing and control unit 22 may include either a special purpose digital computer, a hard wired device, a general purpose digital computer especially programmed to perform the processing, control, and analysis functions required by the system, or a combination of these elements. In the preferred embodiment of the invention, the control unit 22 is a combination of a general purpose digital computer and a plurality of microprocessors. The computer is programmed in a standard manner known in the art to perform the required filtering, smoothing, control and other functions as described below. The microprocessors (detailed below) respectively perform functions to reduce the computational load on the computer. It should be noted however, that the invention hereinafter claimed does not lie in the computer, the specific manner in which it is programmed, or in the particular implementation of microprocessors in combination with the computer.

Connections between the control unit 22 and the other systems of the survey apparatus are made in a conventional manner as is well known in the art. When a general or special purpose digital computer is used, all systems timing and interrupt handling, if any, may be controlled by the computer as is well known in the art.

ERROR CORRECTION

According to the invention described thus far, when the aircraft is within sight of a retroreflector, the control unit 22 receives sufficient data to provide two substantially independent measures of aircraft position. First, the accelerometer signals over lines 108, when processed as described below, provide a first measure of aircraft position. Second, the inertial measurement unit gimbal angle sensing outputs over lines 107, the laser tracker gimbal angle sensing outputs over lines 112, and the laser tracker range data over lines 113 processed through range data processor 140 (part of the control unit 22) provide, in combination with the known location of a retroreflector being tracked, a second measure of aircraft position. If the inertial measurement unit and the laser tracker-retroreflector systems were both error free, both systems would provide identical measurements of aircraft position and the laser tracker-retroreflector system would not be needed at all, the inertial measurement system being sufficient to accurately provide all measurements. (This would also be true if the IMU alone were error free.) However, the systems are not error free, and each one has a plurality of potential, and in the normal instance, actual error sources.

The control unit is therefore provided with a continuing sequence of data measurements, each data measurement containing error information from one or more error sources. It is therefore one function of the data processing and control unit to use all of the available data, that is, data from the IMU and the position tracking device, to generate error correction signals and store error correction data (or simply error corrections) whereby the position of the aircraft can be accurately determined to within known limits and whereby the operating characteristics of the inertial measurement unit and the laser tracker and in particular the error characteristics, are substantially identified and estimated, so that the IMU can thereby be used for predetermined substantial lengths of time when the aircraft is not within sight of a ground cooperating retroreflector.

DETERMINING AIRCRAFT POSITION FROM ACCELEROMETER DATA PROVIDED BY THE INERTIAL MEASUREMENT UNIT

The inertial measurement unit is provided, as noted above, with a plurality of accelerometers 34, 36, 38, mounted on the stable platform, each of which provides continuous signal data over signal paths 108 regarding the acceleration to which it is subjected in its aligned direction. It is well known that the first integral of acceleration is velocity and that the second integral of acceleration, that is, the integral of velocity, is position, that is, the position of the airborne vehicle. A modified double integration procedure as described below is used to process the accelerometer signal data for determining the position of the aircraft from that data.

Figure 6:
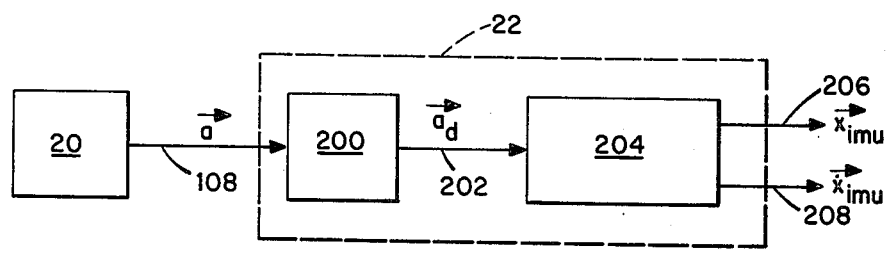
FIG. 6 is a schematic block diagram of the accelerometer data processing means according to a preferred embodiment of the invention.

Referring now to FIG. 6, the inertial measurement unit 20, of the preferred embodiment, provides over lines 108 signal data, $\vec{a}$, from the accelerometers. The arrow over the descriptor "a" indicates that it is a vector quantity having scale components, in this case, three components, $a_1$, $a_2$, and $a_3$. The accelerometer signals $\vec{a}$ are, in this embodiment, analog signals having substantially known characteristic amplitude and bandwidth ranges. The accelerometer signals $\vec{a}$ over line 108 are supplied to control unit 22 and are first preprocessed by a filter 200 to provide a digital (digitized) and smoothed accelerometer output signal level, schematically represented by $\vec{a}_d$ over lines 202. Filter 200 is designed to provide digital signal outputs having substantially the full bandwidth of the original signal (that is a signal sampled at greater than twice the highest frequency component, W, in the original signal $\vec{a}$) and which has been filtered to suppress high frequency noise. In a preferred embodiment of the invention, filter 200 is at least in part a microprocessor which may be physically located away from while remaining conceptually a part of the control unit 22. In other embodiments, the function of filter 200 may be implemented in part by a programmed computer as is well known in the art.

Filter 200 thus typically comprises an analog to digital (A to D) converter which samples and digitizes the accelerometer data. The sampling rate in the preferred embodiment is 400 Hz. (2.5 msec.). The sampled and digitized data is applied to an averaging filter which suppresses the high frequency noise components. The averaging filter is preferably a digital filter which produces at its output over lines 202 an average of each successive group of sixteen samples obtained by optimally fitting (in a least squares sense) a straight line to the data points and evaluating the linear curvefit, for example, at the middle of the sample interval. The output $\vec{a}_d$ of the filter over lines 202 is therefore, in the preferred embodiment, a sampled digital signal wherein samples are preferably provided at a frequency of about 25 Hz. (40 msec.).

The digitized and filtered accelerometer signals over lines 202 are processed by a central processing unit 204 of the control unit 22 according to an integration algorithm which is standard and well known in the art. The algorithms are typical of those described, for example, in Broxmeyer, *Inertial Navigation Systems*, McGraw-Hill, 1964, (Chapters 6 and 7) and G. Merrill (Ed.), *Principles of Guided Missile Design*, "Inertial Navigation" by R. H. Parvin, Chapter 10, which are hereby incorporated by reference, and take into account the anomolies associated with the accelerometer outputs, for example, the effect of gravity, as is well known in the art. The outputs of processing unit 204, after applying the double integration algorithm, are position and velocity vectors which describe the position ($\vec{x}_{imu}$) and velocity ($\vec{\dot{x}}_{imu}$) of the stable platform according to the IMU accelerometer output signals at a periodic rate of 12.5 Hz. and which are schematically indicated over lines 206 and 208 respectively.

The central processing unit 204 may be and preferably is part of a general purpose digital computer having the speed capability and memory capacity to operate in real time. The output signals of processing unit 204 represent, in the preferred embodiment, the position and velocity of the IMU in a locally level north east down coordinate system corresponding to the orientation of the gyros. The output signals 206, 208 include errors, if any, which may occur due, for example, to drift in the orientation of the "locally level" stable platform member or errors in the accelerometer output signals due for example to misalignment, etc. The position and velocity determinations are made repeatedly at times $t_1, t_2, t_3, \ldots, t_i, \ldots$. While a north east down coordinate system (one wherein the first coordinate is north, the second coordinate is east and the third coordinate is down) is preferred, any other known coordinate system could also be implemented.

DETERMINING AIRCRAFT POSITION FROM TRACKING DEVICE AND IMU GIMBAL ANGLE DATA

Figure 7:
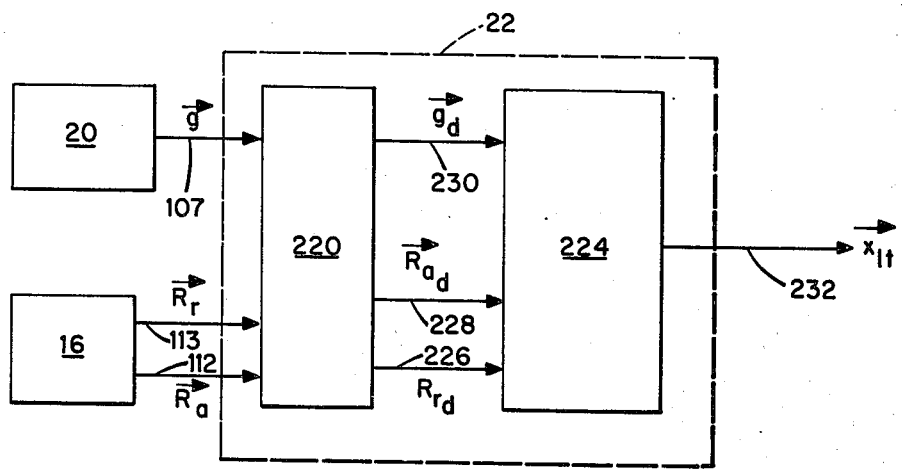
FIG. 7 is a schematic block diagram of the tracker data processing means according to a preferred embodiment of the invention.

Referring now to FIG. 7, the inertial measurement unit gimbal angle sensor outputs, provided over lines 107 and designated $\vec{g}$, and the position tracking device outputs, the range to the retroreflector, designated $R_r$ (and provided in raw form from the tracker to the control unit 22 over lines 113) and the tracker 16 gimbal angle sensor outputs, designated $\vec{R}_a$, (and provided to the control unit 22 over lines 112) are preferably preprocessed by a filter 220 as a first step in the processing sequence. (In the preferred embodiment, the raw range signals are however also processed as noted above by processor 140 prior to reaching filter 220.) The filter 220 is preferably a microprocessor, which may be physically a part of the control unit 22 or which may be a separate piece of hardware. Conceptually, however, filter 220 is a part of the control unit 22 and may, if desired, be implemented using an appropriately programmed digital computer.

In the preferred embodiment, filter 220 has two functions. First, the incoming data is passed through an A to D converter in which it is sampled and digitized. The sample rate is chosen sufficiently high to prevent aliasing and is preferably 400 Hz. for the angle data and 3200 Hz. for the range data. The sampled range data is then passed through an averaging filter, the output of which is the average of each sequential group of 8 samples. The sample rate thus becomes 400 Hz. for both the range and angle signals.

The second function of the filter 220 is to provide a linear curvefit to the sampled and filtered data to provide aircraft position determinations at times $t_1, t_2, \ldots, t_i, \ldots$, coincident with the position determinations provided using the accelerometer output data. It is imperative that the two estimates of position (provided by the IMU and laser tracker) be determined for the same time because aircraft motion, about 2–3 inches per millisecond, would otherwise introduce excessive errors into the system. While such errors could probably be corrected in later processing, it is easier and simpler to require initially that the position determinations be made at coincident times. Thus, in this embodiment, the accelerometer data from the IMU is provided at known times and it is therefore necessary to adjust the data from the laser tracker to be coincident with those times. This is accomplished by filtering the tracker data and the IMU gimbal angle data, for example, by using the optimal straight line, linear curvefit (in a least squares sense) over the 80 msec. time interval corresponding to 32 successive data points, and synchronizing the data by evaluating the linear curvefits at a particular abscissa corresponding to the coincident times. It would be obvious to one skilled in the art that other curvefitting techniques (e.g. other polynomial fits) could be used, however, it has been founc, according to the invention, that a linear curvefit is simple and provides satisfactory results. It should also be obvious that the requirement of coincident time measurements could also be achieved by proper control of the clock timing of the system.

Once the data values of the range, laser tracker angles, and IMU gimbal angles at the coincident times are determined, they are provided at the output of prefilter 220 and are transferred to a Euclidian geometry processing unit 224. The information is transferred over lines 226 (range $R_{rd}$), 228 (tracker angles, $\vec{R}_{ad}$), and 230 (IMU gimbal angles $\vec{g}_d$) respectively. The Euclidian geometry processing unit 224 is preferably implemented by programming a general purpose digital computer although a special purpose device could also be provided. The Euclidian geometry transformation converts the aircraft position information provided by the tracker angle and range signals (and the IMU gimbal angles) to a position determination in the north east down coordinate system of the IMU stable platform 32. This is a linear transformation which, while complex, is well known in the art. The output of the Euclidian geometry transformation over lines 232 schematically indicated as $\vec{x}_{lt}$, is thus the position of the laser tracker relative to the retroreflector being tracked in the platform coordinate system. Preferably, in order to process the information in real time, the position data from the tracker (relative to the retroreflector) and of the IMU sensor angles is provided twelve and one-half times per second.

The two measurement systems, the IMU accelerometer system and the laser tracker—IMU gimbal system, thus provide complementary position data derived from different data sources. The accelerometer data from the inertial measurement unit, which is integrated twice to provide aircraft position, effectively provides smoothed position information having a low frequency bandwidth. The high frequency components of the accelerometer data over lines 108 have effectively been suppressed by integration and filtering and thus do not appear in the output 206 of the integrating unit 204. On the other hand, the data output of the laser tracker typically has substantially no low frequency noise components (i.e. it has substantially no low frequency drift) and contains primarily high frequency noise or error components, which are likewise substantially suppressed by the filter and curvefitting processes. Thus the aircraft position determined from the laser tracker—IMU gimbal angle data, which has substantially no low frequency noise (or drift), has also had its high frequency error components substantially suppressed and eliminated.

POSITION DIFFERENCING

Figure 8:
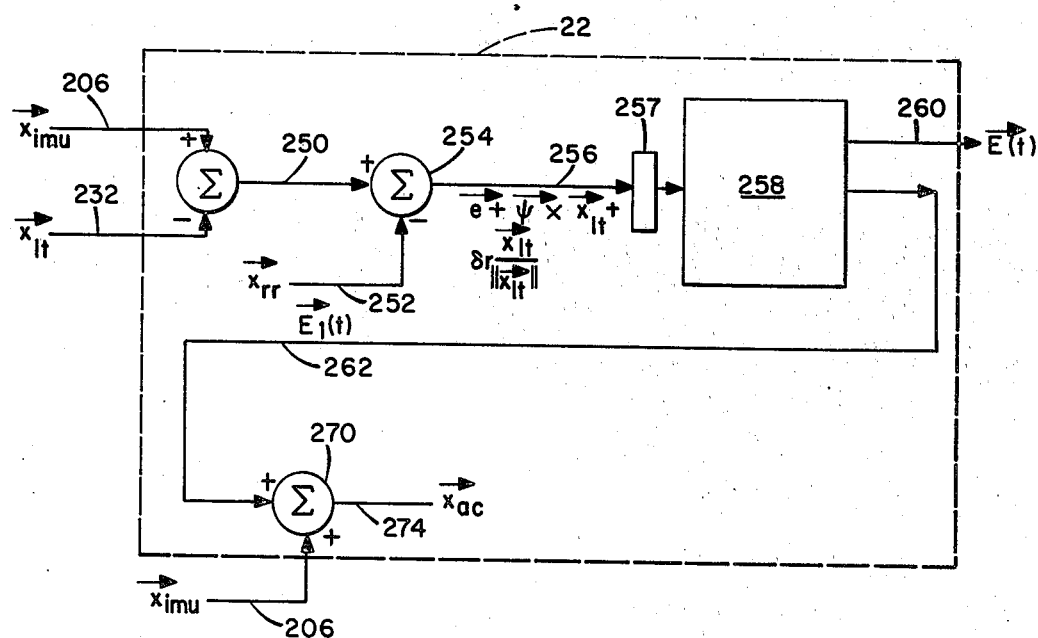
FIG. 8 is a schematic representation of the error correction means according to a preferred embodiment of the invention.

Referring to FIG. 8, the aircraft positions determined by the control unit, $\vec{x}_{imu}$ and $\vec{x}_{lt}$ are differenced at each time $t_1, t_2, \ldots$, to eliminate the aircraft motion and to reduce the bandwidth of the signal on which error estimation techniques will be used. The resulting signal over line 250 is again differenced with the stored position of the tracked retroreflector $\vec{x}_{rr}$ which is provided here schematically over a line 252 from a control unit storage (not shown). The output of summing unit 254 over a line 256 represents the difference in the positions determined by the two systems (the error signal value) and can be written as (to first order):

$$(\vec{x}_{imu} - \vec{x}_{rr}) - \vec{x}_{lt} = \vec{e} + \vec{\psi} \times \vec{x}_{lt} + \delta r \frac{\vec{x}_{lt}}{\|\vec{x}_{lt}\|}$$

where $\vec{e}$ represents the error in the inertial measurement unit and $$\vec{\psi} \times \vec{x}_{lt} + \delta r \frac{\vec{x}_{lt}}{\|\vec{x}_{lt}\|}$$

represents the error in measuring the laser tracker position relative to the retroreflector ($\vec{\psi}$ is an error vector for the laser tracker—IMU gimbal angle system, $\vec{x}_{lt}$ is the measured position of the laser tracker relative to the retroreflector in the north east down coordinate system and $\delta r$ is the bias in the laser ranging device). Typically, this error signal value is generated twelve and one-half times a second. Since the error signal does not contain the relatively higher frequency components of aircraft motion which also appear in $\vec{x}_{lt}$ and $\vec{x}_{imu}$, it may be and is again filtered using a filter 257 and is processed in an error estimation processor 258 based upon known or modeled system parameter error characteristics for the laser tracker and inertial measurement unit. The result of the error estimation process $\vec{E}$ (t), over a line 260, represents the error corrections as a function of time provided by the control unit. The error corrections $\vec{E}$ (t) are stored and updated in the control unit 22, and a position correction vector $\vec{E}_1$ (t) over a line 262, is derived from $\vec{E}$ (t). The correction vector $\vec{E}_1$ (t) is preferably incorporated into the aircraft position calculated from data provided by the inertial measurement unit ($\vec{x}_{imu}$) illustrated schematically as a summing device 270 to produce a revised, error corrected, aircraft position, $\vec{x}_{ac}$ over a line 274. The numerical calculations schematically diagrammed in FIG. 8 are preferably carried out in control unit 22 in a programmed general purpose digital computer as is well known in the art. (Filter 257 may, for example, have as an output the averaged sum of twelve sample inputs thereby providing an input to the processor 258 at approximately 1 Hz.). Other hardware and software or combinations thereof could be used, for example, a special purpose computer or a hard wired device.

According to the preferred embodiment of the invention, the error estimation processor 258 is a Kalman filter, as is well known in the art. The Kalman filter uses a priori estimates and models of the error sources of the inertial measurement unit and laser tracker systems to provide best estimates of the errors in the system. The number of parameters which can be estimated depends upon the real time requirements of the system. For example, a twenty state error vector will typically require about one second of processing time in a moderately fast processor. Thus, twenty error corrections may be provided and updated at a 1 Hz. repetition rate. Other kinds of error estimation processing could also be used, for example, the batch least-squares method could be implemented. We have found however that the Kalman filter technique provides superior error corrections for the processes and interrelationships which appear to be at play here.

In the preferred embodiment of the invention, the accelerometers and gyros of the inertial measurement unit are those used in the Missile Positioning Measuring System (MPMS) currently being manufactured by Northrup for the United States Air Force's MX missile (see e.g. *Aviation Week and Space Technology*, Dec. 13, 1976, cover and pp. 69–70, 75–77). Alternately, other components could be used although with degraded overall performance. For example, a LTN-37 type IMU manufactured by Littoon Industries could be used. Using an inertial measurement unit employing MPMS components in combination with the laser tracker described above, one would expect to be able to be out of sight of the retroreflector for at least 200 seconds. Using the Litton LTN-37 the out of sight time would be reduced to about 60 seconds. During the out of sight time, it is solely the accelerometer data supplied by the inertial measurement unit which is provided to the control unit. The control unit then computes the position and velocity vectors, which are generated in response to the inertial measurement unit output data, corrects the data according to the already stored error corrections as well as the newly generated error corrections, if any, based upon the IMU data, and provides a best estimate of the aircraft position.

The aircraft position, properly formatted and smoothed, is recorded on the magnetic storage unit 102 along with smoothed and formatted altimetry data for later playback on the ground. In this way, the data storage requirements of the disclosed system are minimal and the precision and long term accuracy of the system is maximized since the system "corrects itself" in real time.

In the preferred embodiment of the invention, the parameters of primary importance, for which corrections are determined, are the following:

$\vec{e}$ a linear combination of IMU position error and retroreflector survey error $\dot{\vec{e}}$ IMU velocity error $\vec{\psi}$ vector of platform misalignment angles $\vec{B}_a$ a linear combination of accelerometer bias, vertical accelerometer scale factor error, and gravity model bias error $\vec{\epsilon}$ a linear combination of the constant component of gyro drift and the along-track gravity gradient errors $\vec{\eta}$ a linear combination of various aircraft body-axis-fixed constant angle errors $\eta_4$ the bias error in the inner tracker gimbal $\delta_r$ the bias error in the tracker range measurments.

Errors in measuring these parameters are modelled in the estimation process and are used, for example, in the Kalman filtering algorithm which is set forth in the programs and remarks attached hereto as Appendix A.

While the attached programs are not to be taken as limiting the scope of the invention in any way, they do provide one method of implementing the invention.

The system described has been simulated, using the programs of Appendix A, on a general purpose digital computer at the laboratory of the Assignee of this invention to test the validity of the models and the performance of the system. While these programs themselves form no part of the present invention, they do provide a means by which this system may be implemented on the ground to simulate a real time aerial surveying system.

Other embodiments of the invention will be obvious to those skilled in the art. For example, some of the functions described as being performed within the data processing and control unit may be performed at a physically separated location, for example within the IMU. Nevertheless, these and other additions, substractions, deletions and other changes will be obvious to one skilled in the art and are within the ambit of the following claims.

APPENDIX A

The following source program, designated KALF and written in the PL/1 computer language, implements a Kalman filter according to the invention. Simulated IMU and laser tracker measurement data are provided as one input to the filter and the errors (called truth-model assumptions) in producing the measurement data are provided to be compared against the output of the filter to produce performance statistics.

After the source program listing, there appears the source listings for nine subroutines used by the main program KALF. In addition there are descriptions of five more subroutines for which source listings are not available but which could obviously be written by one skilled in the art from the descriptions provided.

Following the description of the subroutines is a description of the Measurement Data File which describes the measurement data available to the filter.

After the description of the Measurement Data File, the parameters for filter operation and format control are provided. The filter parameters provide initial values from which the filter begins the estimation process and program control parameters.

SOURCE LISTING

```
STMT LEVEL NEST

1             KALF:   PROC OPTIONS(MAIN);

2     1               DEFAULT RANGE(A:H) FLOAT BINARY VALUE(FLOAT BINARY(53)),
                                  RANGE(O:Z) FLOAT BINARY VALUE(FLOAT BINARY(53));

3     1               DECLARE BUFFER(30);
    4     1               DECLARE SPBUF(60) FLOAT BIN(21) INITIAL( (60) 0.0 );
    5     1               DCL TEST CONDITION EXTERNAL;
    6     1               DCL ERROR EXTERNAL CHAR(1);
    7     1               DCL (MTMULT,MINV,VCOMP,COORD,PRINTM,SYMETRY,CORIOLS,
                              MTIDENT,MTZERO,MTTRANP) EXTERNAL ENTRY;
    8     1               DCL MTMOVE EXTERNAL ENTRY (,FIXED BIN(15),FIXED BIN(15),,FIXED BIN(15),FIXED BIN(15),
                              FIXED BIN(15),FIXED BIN(15)   );
    9     1               DCL XPVMOVE EXTERNAL ENTRY(,,FIXED BIN(15),FIXED BIN(15));
   10     1               DCL GFTPHI EXTERNAL ENTRY (FIXED BIN(15),FLOAT BIN(53),,,);
   11     1               DCL ROTATE EXTERNAL ENTRY (FIXED BIN(15),FLOAT BIN(53),);

12     1               DCL (RR,Z,XHAT,STEMP,PE,EPT,PEPT,PX,HE,EHT,HEHT,HEHT1,DELTAE) (*,*) CTL;
   13     1               DCL (XACTUAL,COVAR,RMSTATE,XERRORS,XTRUE,EPS,GAIN,DELTAX) (*,*) CTL;
   14     1               CCL (F,FOLD,FDOT,PHINX,PHINT,GU,QM,EHAT,HBLOCK) (*,*) CTL;
   15     1               DCL (TRACKER,XTOP,EPSUM,SIGMA) (*) CTL;
   16     1               DCL (PCSOFF,UNITR,PXTRAP,W,WDOT,VXTRAP,AXTRAP) (3);
   17     1               DCL (POS,VEL,ACC,POSLT,EFTRUE,TRUE,DIF) (3);
   18     1               DCL (SCHULER,WCROSS,WDOTX,DCSTOB) (3,3);
   19     1               DCL WXSQ(3,3) CTL;
   20     1               DCL UNIT3(3,3) INITIAL(1.0,(3) 0.0,1.0,(3) 0.0,1.0);
   21     1               DCL GEE(3) INITIAL(0.0,0.0,32.17288);

22     1               DCL 1 PLITABS STATIC EXTERNAL,
                            2 (OFFSET INIT(14),PAGESIZE INIT(60), LINESIZE INIT(132),
                              PAGELENGTH INIT(0), FILLER1 INIT(0),FILLER2 INIT(0),
                              FILLER3 INIT(0),NO_OF_TABS INIT(4),TAB1 INIT(1),
                              TAB2 INIT(41),TAB3 INIT(81),TAB4 INIT(121)) FIXED BIN (15,0);

23     1               ON CONDITION(TEST) BEGIN;
   24     2                 IF ERROR='1' THEN GO TO ENDJOB;
   25     2               END;

26     1               OPEN FILE(SYSPRINT) OUTPUT STREAM PRINT;
   27     1               OPEN FILE(KALFIN) INPUT RECORD;

/*    READ HEADER RECORDS FROM USGS SIMULATION PROGRAM   */
   28     1               READ FILE(KALFIN) INTO(BUFFER);
   29     1               NX=BUFFER(1); NU=BUFFER(2); NM=BUFFER(3); NRR=BUFFER(4);
   33     1               DTSIM=BUFFER(5); DT=BUFFER(6); TMAX=BUFFER(7);
   36     1               N=NX+NU; L=3;
   38     1               ALLOCATE XACTUAL(N,1);
   39     1               PUT FILE(SYSPRINT) SKIP DATA(NX,NU,NM);
   40     1               PUT FILE(SYSPRINT) SKIP DATA(N,L,NRR);
   41     1               PUT FILE(SYSPRINT) SKIP DATA(DTSIM,DT,TMAX);
   42     1               DO I=1 TO 3;
   43     1    1            POSOEF(I)=BUFFER(I+7);
   44     1    1            DO J=1 TO 3;
   45     1   12              DCSTOB(I,J)=BUFFER(10+J+(I-1)*3);
   46     1   12            END;
   47     1    1          END;

48     1               READ FILE(KALFIN) INTO(BUFFER);
   49     1               DO I=1 TO NU;
   50     1    1            XACTUAL(NX+I,1)=BUFFER(I);
   51     1    1          END;

52     1               ALLOCATE RR(3,NRR);
   53     1               DO I=1 TO NRR BY 10;
   54     1    1            READ FILE(KALFIN) INTO(BUFFER);
   55     1    1            MAXRR=MIN(I+9,NRR);
   56     1    1            DO J=I TO MAXRR;
   57     1   12              DO K=1 TO 3;
   58     1  123               RR(K,J)=BUFFER(K+(J-I)*3);
   59     1  123               END;
   60     1   12            END;
   61     1    1          END;

/*   ESTABLISH INPUT PARAMETERS FOR THE PROGRAM.  */
   62     1               NSTATE=20; NXTRAP=3;
   64     1               ALLOCATE EHAT(NSTATE,NSTATE);  EHAT=0.0;
   66     1               EHAT(1,1),EHAT(2,2),EHAT(3,3)=1000.0;
   67     1               EHAT(4,4),EHAT(5,5),EHAT(6,6)=5;
   68     1               EHAT(7,7),EHAT(8,8),EHAT(9,9)=.005;
   69     1               EHAT(10,10),EHAT(11,11),EHAT(12,12)=2.E-7;
```

```
 70    1                    EHAT(13,13),EHAT(14,14)=.001;  EHAT(15,15)=.0002;
 72    1                    EHAT(16,16),EHAT(17,17),EHAT(18,18)=.001;
 73    1                    EHAT(19,19)=.0002;  EHAT(20,20)=2;
 75    1                    CALL MTZERO(EHAT,QM);
 76    1                    QM(1,1),QM(2,2),QM(3,3)=0.0E-8;
 77    1                    QM(4,4),QM(5,5),QM(6,6)=0.0E-10;
 78    1                    QM(7,7),QM(8,8),QM(9,9)=0.0E-16;
 79    1                    RERR=0.0;  AERR=0.0;
 81    1                    T0=TMAX;  TSTOP=TMAX;  DTXTRAP=DT;  DTPLOT=0.0;  DTREAD=DT;  DTPRINT=DT;
 87    1                    SIGTHRESH=3.0;  CCTHRESH=0.98;  SIGCON=100;
 90    1                    GET FILE(SYSIN) DATA;
 91    1                    EHAT=EHAT*EHAT;
 92    1                    IF RERR<=0.0 THEN JITER=0;  ELSE JITER=1;
 94    1                    IF AERR<=0.0 THEN JITER=0;
 95    1                    IF JITER=1 THEN DO;
 96    1   1                  AWEIGHT=(AERR*AERR)/.54;
 97    1   1                  RWEIGHT=(RERR*RERR);
 98    1   1                END;
 99    1                    DTXTRAP=MAX(DT , DTXTRAP);
100    1                    DTXTRAP=FIXED(DTXTRAP/DT+0.5)*DT;
101    1                    QM=QM*DTXTRAP;
102    1                    DTREAD=MAX(DTXTRAP , DTREAD);
103    1                    DTREAD=FIXED(DTREAD/DTXTRAP+0.5)*DTXTRAP;
104    1                    DTPRINT=MAX(DTXTRAP , DTPRINT);
105    1                    DTPRINT=FIXED(DTPRINT/DTXTRAP+0.5)*DTXTRAP;
106    1                    DTPLOT=MAX(0.0,DTPLOT);
107    1                    IF DTPLOT>0.0 THEN DO;
108    1   1                  DTPLOT=MAX(DTXTRAP,DTPLOT);
109    1   1                  DTPLOT=FIXED(DTPLOT/DTXTRAP+0.5)*DTXTRAP;
110    1   1                  OPEN FILE(KALFOUT) OUTPUT RECORD;
111    1   1                END;
112    1                    IF TMAX<=0.0 THEN TMAX=T0;
113    1                    TMAX=MIN(TMAX,T0);
114    1                    IF TSTOP<=0.0 THEN TSTOP=TMAX;
115    1                    TSTOP=MIN(TSTOP,TMAX);
116    1                    IF SIGTHRESH<=0.0 THEN SIGTHRESH=10.0;
117    1                    IF CCTHRESH<1.0E-60 THEN CCTHRESH=1.0;
118    1                    PUT FILE(SYSPRINT) SKIP DATA(TMAX,TSTOP);
119    1                    PUT FILE(SYSPRINT) SKIP DATA(DTXTRAP,DTREAD,DTPRINT);
120    1                    PUT FILE(SYSPRINT) SKIP DATA(DTPLOT,RERR,AERR);
121    1                    PUT FILE(SYSPRINT) SKIP DATA(SIGTHRESH,SIGCON,CCTHRESH);
122    1                    PUT FILE(SYSPRINT) SKIP DATA(NXTRAP,NSTATE);

/* INITIALIZE ARRAYS AND CONSTANTS USED BY THE KALMAN FILTER. */

123    1                    SIGCON=EXP(-DTREAD/SIGCON);
124    1                    ALLOCATE XTOP(NX);
125    1                    ALLOCATE XTRUE(NSTATE,1);  XTRUE=0.0;
127    1                    ALLOCATE XERRORS(NSTATE,1);
128    1                    ALLOCATE XHAT(NSTATE,1);  XHAT=0.0;
130    1                    ALLOCATE COVAR(L,L);
131    1                    ALLOCATE RMSTATE(NSTATE,1);  RMSTATE=0.0;
133    1                    ALLOCATE TRACKER(NM);
134    1                    ALLOCATE Z(L,1),EPS(L,1),EPSUM(L),SIGMA(L);  SIGMA=0.00;
136    1                    ALLOCATE F(NX,NX); F=0.0;
138    1                    ALLOCATE FOLD(NX,NX);  FOLD=0.0;  ALLOCATE FDOT(NX,NX);
141    1                    ALLOCATE GU(NX,NSTATE-NX);  GU=0.0;
143    1                    ALLOCATE HBLOCK(L,NSTATE);  HBLOCK=0.0;
145    1                    ALLOCATE STEMP(3,3);
146    1                    ALLOCATE PE(NX,NSTATE);
147    1                    ALLOCATE PX(NX,1);
148    1                    ALLOCATE PEPT(NX,NX);
149    1                    CALL MTIDENT(COVAR,COVAR);
150    1                    CALL MTMOVE(UNIT3,1,1,HBLOCK,1,1,3,3);
151    1                    CALL MTMOVE(UNIT3,1,1,F,1,4,3,3);
152    1                    CALL MTMOVE(UNIT3,1,1,GU,4,7,3,3);
153    1                    CALL MTMOVE(UNIT3,1,1,GU,7,1,3,3);
154    1                    READ FILE(KALFIN) INTO (BUFFER);
155    1                    T=BUFFER(1);
156    1                    KRR=BUFFER(2);
157    1                    LINES=0;  TINIT=T;  TXTRAP=T-DTXTRAP;  TPRINT=T-DTPRINT;  TREAD=T-DTREAD;
162    1                    IF DTPLOT=0.0 THEN TPLOT=2.0*TMAX;  ELSE TPLOT=T-DTPLOT;
164    1                    MEASW=1;  GZERO=GEE(3);  RZERO=5280.0*3959.0;
167    1                    SCHULER=-GZERO/RZERO*UNIT3;  SCHULER(3,3)=2*GZERO/RZERO;
169    1                    DF=-NSTATE/L;  KRRSW=0;  EPSUMA=0.0;  EPSUMR=0.0;  EPSRMS=0.0;  EPSUM=0.0;

/* TIME SIMULATION LOOP */

175    1                    DO WHILE ( T<=TMAX );

1   1                  /* PART 1: TAKE MEASUREMENTS FROM THE INPUT DATA SET. */
176    1   1                  DO I=1 TO 3;
177    1   12                   POS(I)=BUFFER(2+I);
178    1   12                   VEL(I)=BUFFER(5+I);
179    1   12                   ACC(I)=BUFFER(8+I);
180    1   12                 END;
181    1   1                  DO I=1 TO NX;
182    1   12                   XTOP(I)=BUFFER(11+I);
183    1   12                 END;
184    1   1                  DO I=1 TO NM;
185    1   12                   TRACKER(I)=BUFFER(11+NX+I);
186    1   12                 END;

1   1                  /* PART 2: EXTRAPOLATE THE STATE 'XHAT' AND THE COVARIANCE 'EHAT'
       1   1                             FOR THE SYSTEM DYNAMICS. */
187    1   12                 IF T-TXTRAP >= DTXTRAP-DT/2.0 THEN DO;
188    1   12                   TXTRAP=T;
189    1   12                   AXTRAP=ACC;
190    1   12                   IF MEASW=0 THEN DO I=1 TO 3;
191    1   123                    PXTRAP(I)=POS(I)-XHAT(I,1);
192    1   123                    VXTRAP(I)=VEL(I)-XHAT(I+3,1);
193    1   123                    DO J=1 TO NSTATE;
194    1   1234                     IF J<=NX THEN AXTRAP(I)=AXTRAP(I)-F(I+3,J)*XHAT(J,1);
195    1   1234                     ELSE AXTRAP(I)=AXTRAP(I)-GU(I+3,J-NX)*XHAT(J,1);
196    1   1234                   END;
197    1   123                  END;
198    1   12                   ELSE DO;
199    1   123                    VXTRAP=VEL;
200    1   123                    PXTRAP=POS;
201    1   123                  END;
202    1   12                   CALL VCOMP(POSOEF,PXTRAP,EFTRUE);
203    1   12                   CALL CORIOLS(EFTRUE(1),PXTRAP,VXTRAP,AXTRAP,W,WDOT);
204    1   12                   CALL XPVMOVE(W,WCROSS,1,1);
205    1   12                   CALL XPVMOVE(WDOT,WDOTX,1,1);
206    1   12                   CALL MTMULT(WCROSS,WCROSS,WXSQ);
207    1   12                   CALL MTMOVE(SCHULER-WDOTX-WXSQ,1,1,F,4,1,3,3);
208    1   12                   CALL XPVMOVE(-2.0*W,F,4,4);
209    1   12                   CALL XPVMOVE(AXTRAP-GFE,F,4,7);
210    1   12                   CALL XPVMOVE(-W,F,7,7);
211    1   12                   IF T>TINIT+DT/2.0 THEN DO;
212    1   123                    FDOT=(F-FOLD)/DTXTRAP;
213    1   123                    CALL GETPHI(NXTRAP,DTXTRAP,FOLD,FDOT,PHINX,PHINT);
214    1   123                    CALL PHIMULSP(PHINX,PHINT,EHAT,PE);
215    1   123                    CALL MTTRANP(PE,EPT);
216    1   123                    CALL PHIMULSP(PHINX,PHINT,EPT,PEPT);
217    1   123                    CALL PHIMULSP(PHINX,PHINT,XHAT,PX);
218    1   123                    CALL MTMOVE(PEPT,1,1,EHAT,1,1,NX,NX);
219    1   123                    CALL MTMOVE(PE,1,NX+1,EHAT,1,NX+1,NX,NSTATE-NX);
220    1   123                    CALL MTMOVE(EPT,NX+1,1,EHAT,NX+1,1,NSTATE-NX,NX);
221    1   123                    CALL SYMETRY(EHAT);
222    1   123                    CALL MTMOVE(PX,1,1,XHAT,1,1,NX,1);
223    1   123                  END;
       1   12
```

```
224    1   12         FOLD=F;
225    1   12         IF KRP=0 THEN DO;
226    1   123           DF=DF*SIGCON;
227    1   123           EPSUMA=EPSUMA*SIGCON;
228    1   123           EPSUMR=EPSUMR*SIGCON;
229    1   123           EPSRMS=EPSRMS*SIGCON;
230    1   123           EPSUM=EPSUM*SIGCON;
231    1   123           KRRSW=MAX(0,KRRSW-10);
232    1   123         END;
       1   12
       1   12          /* PART 3:  IF THERE IS A MEASUREMENT, THEN UPDATE THE STATE AND THE
       1   12                      COVARIANCE MATRIX.                                      */
       1   12
233    1   12         ELSE IF ( (T<=TSTOP) & ( T-TREAD >= DTREAD-DT/2.0 ) ) THEN DO;
234    1   123          LINES=LINES+1;   KRRSW=KRRSW+1;   TREAD=T;
237    1   123          Z(*,1)=-TRACKER(6)*UNIT3(*,3);
239    1   123          CALL ROTATE(2,TRACKER(5),Z);
235    1   123          CALL ROTATE(1,TRACKER(4),Z);
240    1   123          CALL MTMULT(DCSTOB,Z,Z);
241    1   123          DO I=1 TO 3;
242    1   1234           CALL ROTATE(I,TRACKER(I),Z);
243    1   1234         END;
       1   123
244    1   123          POSLT=Z(*,1);
245    1   123          BOUNDF=3.0*(EHAT(1,1)+EHAT(2,2)+EHAT(3,3));
246    1   123          BOUNDM=(XHAT(7,1)**2+XHAT(8,1)**2+XHAT(9,1)**2);
247    1   123          BOUNDM=BOUNDM-3.0*(EHAT(7,7)+EHAT(8,8)+EHAT(9,9));
249    1   123          BOUNDM=SUM(POSLT*POSLT)+BOUNDM;
249    1   123          MEASW=1;
250    1   123          IF BOUNDF<BOUNDM THEN DO;
251    1   1234          DIF(1)=POS(1)-XHAT(1,1); DIF(2)=POS(2)-XHAT(2,1); DIF(3)=POS(3)-XHAT(3,1)
254    1   1234          CALL VCOMP(POSOEF,DIF,EFTRUE);
255    1   1234          MEASW=0;
256    1   1234         END;
257    1   123          ELSE CALL VCOMP(RR(*,KRR),POSLT,EFTRUE);
258    1   123          CALL COORD(POSOEF,EFTRUE,TRUE);
259    1   123          CALL COORD(RR(*,KRR),EFTRUE,DIF);
260    1   123          Z(*,1)=POS-TRUE+DIF-POSLT;
261    1   123          CALL BLOCKDEF;
262    1   123          CALL MTMULT(HBLOCK,EHAT,HE);
263    1   123          CALL MTTRANP(HE,EHT);
264    1   123          CALL MTMULT(HBLOCK,EHT,HEHT);
265    1   123          HEHT=HEHT+COVAR;
266    1   123          CALL SYMETRY(HEHT);
267    1   123          CALL MINV(HEHT,HEHT1,DET,1.0E-60);
268    1   123          CALL SYMETRY(HEHT1);
269    1   123          CALL MTMULT(EHT,HEHT1,GAIN);
270    1   123          CALL MTMULT(GAIN,HE,DELTAE);
271    1   123          CALL SYMETRY(DELTAE);
272    1   123          EHAT=EHAT-DELTAE;
273    1   123          CALL MTMULT(HBLOCK,XHAT,EPS);
274    1   123          EPS=Z-EPS;
275    1   123          CALL MTMULT(GAIN,EPS,DELTAX);
276    1   123          XHAT=XHAT+DELTAX;
277    1   123          IF KRRSW>3 THEN DO;
278    1   1234           DF=DF+1.0;
279    1   1234           EPSQ=SUM(EPS*EPS);
280    1   1234           EPSUBRSQ=SUM(EPS(*,1)*UNITR)**2;
281    1   1234           EPSRMS=EPSRMS+EPSQ;
282    1   1234           EPSUMA=EPSUMA+(EPSQ-EPSUBRSQ)/DISTSQ;
283    1   1234           EPSUMR=EPSUMR+EPSUBRSQ;
284    1   1234           EPSUM=EPSUM+EPS(*,1)*EPS(*,1);
285    1   1234         END;
       1   123
       1   123          /* PRINT OUT BAD DATA POINTS. */
286    1   123          IF ( (DF>L) & (KRRSW>3) ) THEN DO J=1 TO L;
287    1   1234           SIGMA(J)=SQRT(EPSUM(J)/DF);
288    1   1234           SIGLIM=SIGMA(J)*SIGTHRESH;
289    1   1234           IF SIGTHRESH<10.0 THEN DO;
290    1   12345           IF ABS(EPS(J,1)) > SIGLIM THEN
291    1   12345            PUT FILE(SYSPRINT) SKIP DATA(T,EPS(J,1));
292    1   1234           END;
293    1   123          END;
294    1   12         END;
       1   1
295    1   1         IF T-TPLOT >= DTPLOT-DT/2.0 THEN PLOTSW=1;   ELSE PLOTSW=0;
297    1   1         IF T-TPRINT >= DTPRINT-DT/2.0 THEN PRINTSW=1; ELSE PRINTSW=0;
       1   1
       1   1          /* PART 4:  PERFORM CALCULATIONS PRIOR TO OUTPUT. */
299    1   1         IF PLOTSW+PRINTSW>0.0 THEN DO;
300    1   12          DO I=1 TO NX;
301    1   123           XACTUAL(I,1)=XTOP(I);
302    1   123          END;
303    1   12          CALL MTMOVE(XACTUAL,1,1,XTRUE,1,1,9,1);
304    1   12          CALL MTMOVE(XACTUAL,10,1,XTRUE,16,1,3,1);
305    1   12          CALL MTMOVE(XACTUAL,16,1,XTRUE,10,1,3,1);
306    1   12          DO I=1 TO 3;
307    1   123           XTRUE(I+12,1)=XACTUAL(I+24,1)+XACTUAL(I+18,1)+XACTUAL(22,1)*DCSTOB(I,1);
308    1   123          END;
309    1   12          XTRUE(NSTATE-1,1)=XACTUAL(23,1);
310    1   12          XTRUE(NSTATE,1)=XACTUAL(24,1);
311    1   12          XERRORS=-XHAT+XTRUE;
312    1   12          IF DF>L THEN DO;
313    1   123           RMSERROR=SQRT(EPSRMS/DF/3.0);
314    1   123           AERR=SQRT(EPSUMA/DF/2.0*.54);
315    1   123           RERR=SQRT(EPSUMR/DF);
316    1   123          END;
317    1   12          DO J=1 TO NSTATE;
318    1   123           RMSTATE(J,1)=SQRT(EHAT(J,J));
319    1   123          END;
320    1   12         END;
       1   1
       1   1          /* PART 4A:  PRINTOUT EVERY DTPRINT SECONDS. */
321    1   1         IF PRINTSW>0.0 THEN DO;
322    1   12          TPRINT=T;
323    1   12          PUT FILE(SYSPRINT) SKIP(4) DATA(T,LINES,KRR);
324    1   12          CALL PRINTM(XTRUE,SYSPRINT);
325    1   12          CALL PRINTM(XERRORS,SYSPRINT);
326    1   12          IF DF>L THEN DO;
327    1   123           PUT FILE(SYSPRINT) SKIP DATA(DF,KRRSW,MEASW);
328    1   123           PUT FILE(SYSPRINT) SKIP DATA(RMSERROR,RERR,AERR);
329    1   123           PUT FILE(SYSPRINT) SKIP DATA(SIGMA);
330    1   123          END;
       1   12
331    1   12          IF SIGTHRESH<10.0 THEN CALL PRINTM(RMSTATE,SYSPRINT);
332    1   12          DO I=1 TO NSTATE-1;
333    1   123           DO J=I+1 TO NSTATE;
334    1   1234           CORCOEF=EHAT(I,J)/( RMSTATE(I,1)*RMSTATE(J,1) );
335    1   1234           IF(ABS(CORCOEF)>CCTHRESH) THEN PUT FILE(SYSPRINT) SKIP DATA(EHAT(I,J),CORCOEF);
336    1   1234          END;
337    1   123          END;
338    1   12         END;
       1   1
       1   1          /* PART 4B:  WRITE ON DISC FOR PLOT PROGRAM EVERY DTPLOT SECONDS. */
339    1   1         IF PLOTSW>0.0 THEN DO;
340    1   12          TPLOT=T;
341    1   12          DO I=1 TO NSTATE;
342    1   123           SPBUF(I+8)=XERRORS(I,1);
343    1   123           SPBUF(I+8+NSTATE)=RMSTATE(I,1);
344    1   123          END;
```

```
345     1  12              SPBUF(1)=T;
346     1  12              SPBUF(2)=DF;
347     1  12              SPBUF(3)=RMSERROR;
348     1  12              SPBUF(4)=RERR;
349     1  12              SPBUF(5)=AERR;
350     1  12              SPBUF(6)=SIGMA(1); SPBUF(7)=SIGMA(2); SPBUF(8)=SIGMA(3);
353     1  12              WRITE FILE(KALFOUT) FROM(SPBUF);
354     1  12              END;
        1
355     1  1               READ FILE(KALFIN) INTO (BUFFER);
356     1  1               T=BUFFER(1);
357     1  1               KRR=BUFFER(2);
358     1  1               END;
        1
359     1     BLOCKDEF: PROC;
        2
360     2        DCL (DCBTOP) (3,3);
        2
361     2        DCL (ZTEMP) (3,1);
362     2        DCL (ZCTL) (3,1) CTL;
        2
363     2        CALL XPVMOVE(-POSLT,HBLOCK,1,7);
364     2        DCBTOP=UNIT3;
365     2        DO IROW=1 TO 3;
366     2  1        CALL ROTATE(IROW,TRACKER(IROW),DCBTOP);
367     2  1     END;
        2
368     2        CALL XPVMOVE(POSLT,STEMP,1,1);
369     2        CALL MTMULT(STEMP,DCBTOP,STEMP);
370     2        ZTEMP(*,1)=UNIT3(*,2);
371     2        CALL ROTATE(1,TRACKER(4),ZTEMP);
372     2        CALL MTMULT(DCSTOB,ZTEMP,ZCTL);
373     2        CALL MTMULT(STEMP,ZCTL,ZCTL);
374     2        DISTSQ=SUM(POSLT*POSLT);
375     2        UNITR=POSLT/SQRT(DISTSQ);
376     2        CALL MTMOVE(STEMP,1,1,HBLOCK,1,13,3,3);         /* BODY AX ANG ERR */
377     2        HBLOCK(*,NSTATE)=-UNITR;                        /* TRACKER RANGE BIAS */
378     2        HBLOCK(*,NSTATE-1)=ZCTL(*,1);                   /* IN TRAK ANGLE ERROR */
379     2        IF JITER=1 THEN DO;
380     2  1        DO IROW=1 TO 3;
381     2  12         DO JCOL=1 TO 3;
382     2  123           COVAR(IROW,JCOL)=(RWEIGHT-AWEIGHT*DISTSQ)*UNITR(IROW)*UNITR(JCOL);
383     2  123        END;
        2  12
384     2  12         COVAR(IROW,IROW)=COVAR(IROW,IROW)+AWEIGHT*DISTSQ;
385     2  12      END;
386     2  1     END;
        2
387     2     END BLOCKDEF;
        1
388     1     PHIMULSP: PROC(PHI0,PHI1GU,X,Y);
        2            /* THIS SUBROUTINE IS A SPECIAL PURPOSE MATRIX MULTIPLY WHICH COMPUTES
        2               THE EXPRESSION Y=(PHI0 PHI1GU)*X WHILE TAKING ADVANTAGE OF THE FACT
        2               THAT (PHI0 PHI1GU) CONSISTS OF 40 PERCENT ZEROES.      */
389     2        DCL (PHI0,PHI1GU,X,Y) (*,*);
        2
390     2        Y=0.0;
391     2        N2=DIM(X,2);  N1=DIM(PHI0,1);
393     2        DO I=1 TO N2;
394     2  1        DO K=1 TO 3;
395     2  12         DO J=1 TO N1;
396     2  123          Y(J,I)=Y(J,I)+PHI0(J,K+6)*X(K+6,I)+PHI1GU(J,K+6)*X(K+9,I);
397     2  123          IF J<7 THEN Y(J,I)=Y(J,I)+PHI0(J,K)*X(K,I)+PHI0(J,K+3)*X(K+3,I)+
        2  123                                    PHI1GU(J,K+3)*X(K+15,I);
398     2  123       END;
399     2  12     END;
400     2  1   END;
        2
401     2     END PHIMULSP;
        1
402     1  ENDJOB: END KALF;
        1  COORD:  PROC(V1,V2,X);
2              DEFAULT RANGE(A:H) FLOAT BINARY VALUE(FLOAT BINARY(53)),
        1              RANGE(O:Z) FLOAT BINARY VALUE(FLOAT BINARY(53));
        1                /* GIVEN V1 AND V2 AS LATITUDE LONGITUDE AND ELEVATION,
        1                PRODUCE THE VECTOR (V2-V1) IN A COORD. SYSTEM
        1                WHICH IS NORTH-EAST-DOWN AT V2.       */
3       1        DCL (V1,V2,X,VSTORE) (3);
4       1        DCL R0 INITIAL(20901400.0);
5       1        RE=R0+V1(3);
6       1        DLAM=V2(1)-V1(1);
7       1        CLAM1=COS(V1(1));
8       1        CDLAM=2.0*(SIN(DLAM/2.0))**2;
9       1        DL=V2(2)-V1(2);
10      1        CDL=2.0*(SIN(DL/2.0))**2;
11      1        DH=V2(3)-V1(3);
12      1        VSTORE(1)= RE*(SIN(DLAM)-CLAM1*SIN(V2(1))*CDL);
13      1        VSTORE(2)= RE*CLAM1*SIN(DL);
14      1        VSTORE(3)= -DH-RE*(CDLAM+CLAM1*COS(V2(1))*CDL);
15      1        X=VSTORE;
16      1     END COORD;
100          CORICLS: PROC(LAT,POS,VEL,ACCEL,W,WDOT);
200     1        DEFAULT RANGE(A:H) FLOAT BINARY VALUE(FLOAT BINARY(53)),
        1                RANGE(O:Z) FLOAT BINARY VALUE(FLOAT BINARY(53));
400     1        DCL LAT FLOAT BIN(53) ;
500     1        DCL (VEL,ACCEL,W,WDOT,V,OMEGA,DPOSDT) (3);
600     1        DCL R0 STATIC INITIAL(20901400.0);
700     1        DCL PI STATIC INITIAL(3.14159265358979);
800     1        DCL CROSS EXTERNAL ENTRY;
        1              /*   CORRECT VEL AND ACCEL FOR ROTATING COORDINATE FRAME. */
1000    1        CM=PI/43200;
1100    1        OMEGA(1)=CM*COS(LAT);
1200    1        OMEGA(2)=0.0;
1300    1        OMEGA(3)=-CM*SIN(LAT);
1400    1        W(1)=OMEGA(1)+VEL(2)/R0;
1500    1        W(2)=OMEGA(2)-VEL(1)/R0;
1600    1        W(3)=OMEGA(3)-VEL(2)*TAN(LAT)/R0;
1700    1        WDOT(1)=(OMEGA(3)*VEL(1)+ACCEL(2))/R0;
1800    1        WDOT(2)=-ACCEL(1)/R0;
1900    1        WDOT(3)=(-OMEGA(1)*VEL(1)-ACCEL(2)*TAN(LAT))/R0
        1                -(VEL(2)/COS(LAT)/R0)**2;
2100    1        DPOSDT=VEL;   CALL CROSS(W,POS,V);   VEL=VEL+V;
2200    1        CALL CROSS(W,DPOSDT,V);  ACCEL=ACCEL+2.0*V;
2300    1        CALL CROSS(WDOT,POS,V);  ACCEL=ACCEL+V;
2400    1        END CORICLS;
100          GETPHI: PROC(N,DT,A,ADOT,PHI,PHINT);
        1              /* THIS SUBROUTINE COMPUTES THE STATE TRANSITION MATRIX AND THE
        1                 CONSTANT FORCING-FUNCTION MATRIX FOR THE CASE OF A SYSTEM DYNAMICS
        1                 MATRIX WHICH IS LINEAR IN T IN THE INTERVAL (0,DT).     */
500     1        DEFAULT RANGE(A:H) FLOAT BINARY VALUE(FLOAT BINARY(53)),
        1                RANGE(O:Z) FLOAT BINARY VALUE(FLOAT BINARY(53));
700     1        DCL (A,ADOT) (*,*);
800     1        DCL (BCSCRAT,PHI,PHINT) (*,*) CTL;
900     1        DCL (BSUBN,BSUBNPL1,CSUBN,CSUBNPL1) (*,*) CTL;
1000    1        DCL MTIDENT EXTERNAL ENTRY;
1100    1        DCL NTREE STATIC INITIAL(0);
```

```
1200   1                      NTREE=NTREE+1;
1300   1                      IF NTREE=1 THEN DO;
1400   1   1                      NN=DIM(A,1);
1500   1   1                      ALLOCATE BCSCRAT(NN,NN);
1600   1   1                      ALLOCATE BSUBN(NN,NN);
1700   1   1                      ALLOCATE BSUBNPL1(NN,NN);
1800   1   1                      ALLOCATE CSUBN(NN,NN);
1900   1   1                      ALLOCATE CSUBNPL1(NN,NN);
2000   1   1                      ALLOCATE PHI(NN,NN);
2100   1   1                      ALLOCATE PHINT(NN,NN);
2200   1                      END;

2300   1                      CALL MTIDENT(A,BCSCRAT);
2400   1                      CSUBN,BSUBN=A;
2500   1                      CALL AMULSP(A,A,BSUBNPL1);
2600   1                      BSUBNPL1=BSUBNPL1+ADOT;
2700   1                      CSUBNPL1=BSUBNPL1+ADOT;
2800   1                      SCALE=DT*DT/2.0;
2900   1                      PHI=( BCSCRAT+(BSUBN*DT)+(BSUBNPL1*SCALE) );
3000   1                      SCALE1=SCALE*DT/3.0;
3100   1                      PHINT=( (BCSCRAT*DT)+(CSUBN*SCALE)+(CSUBNPL1*SCALE1) );
3200   1                      DO ICOUNT=3 TO M;
3300   1   1                      CALL AMULSP(ADOT,BSUBN,BCSCRAT);
3400   1   1                      BSUBN=BSUBNPL1;
3500   1   1                      CALL AMULSP(A,BSUBN,BSUBNPL1);
3600   1   1                      BSUBNPL1=BSUBNPL1+BCSCRAT*(ICOUNT-1);
3700   1   1                      PHI=PHI+BSUBNPL1*SCALE1;
3800   1   1                      IF ICOUNT>3 THEN CALL AMULSP(ADOT,CSUBN,BCSCRAT);
3900   1   1                      CSUBN=CSUBNPL1;
4000   1   1                      CALL AMULSP(A,CSUBN,CSUBNPL1);
4100   1   1                      CSUBNPL1=CSUBNPL1+BCSCRAT*ICOUNT;
4200   1   1                      SCALE1=SCALE1*DT/(ICOUNT+1);
4300   1   1                      PHINT=PHINT+CSUBNPL1*SCALE1;
4400   1   1                  END;

4500   1       AMULSP:    PROC(F,X,Y);
       2
       2                   /* THIS IS A SPECIAL PURPOSE MATRIX MULTIPLY WHICH TAKES ADVANTAGE
       2                      OF THE FACT THAT THE PARTICULAR SYSTEM DYNAMICS MATRIX IS SPARSE. */
4800   2                  DCL (F,X,Y) (*,*);
       2
4900   2                  DCL (I,J,K,L,KK,N) INIT(1);
5000   2                  DCL KNEX(3) INIT(2,3,1);
       2
5100   2                  N=DIM(X,2);
5200   2                  DO I=1 TO N;
5300   2   1                  DO J=1 TO 3;
5400   2   12                     Y(J,I)=F(J,J+3)*X(J+3,I);
5500   2   12                     Y(J+3,I)=F(J+3,J)*X(J,I);
5600   2   12                     K=KNEX(J);
5700   2   12                     L=KNEX(K);
5800   2   12                     DO KK=1 TO 3;
5900   2   123                        Y(J+3,I)=Y(J+3,I)+F(J+3,K)*X(K,I)+F(J+3,L)*X(L,I);
6000   2   123                        IF KK=3 THEN Y(J+6,I)=F(J+6,K)*X(K,I)+F(J+6,L)*X(L,I);
6100   2   123                        K=K+3;
6200   2   123                        L=L+3;
6300   2   123                     END;
6400   2   12                   END;
6500   2   1                  END;
       2
6600   2                  END AMULSP;
       1
6700   1              END GETPHI;

1          MTMOVE:  PROC(A,IA,JA,B,IB,JB,NR,NC);
                       /* THIS PROC MOVES A SUBSET OF ONE MATRIX INTO ANOTHER */
   2   1               DEFAULT RANGE(A:H) FLOAT BINARY VALUE(FLOAT BINARY(53)),
                               RANGE(O:Z) FLOAT BINARY VALUE(FLOAT BINARY(53));
   3   1               DCL (A,B) (*,*) BIN(53) FLOAT;
   4   1               LRA=IA+(NR-1);   LCA=JA+(NC-1);
   6   1               DO I=IA TO LRA ;
   7   1   1               DO J=JA TO LCA ;
   8   1   12                  B(IB-IA+I,JB-JA+J)=A(I,J);
   9   1   12              END;
  10   1   1           END;
  11   1               END MTMOVE;

1          PRINTM:  PROC(DATA,PFILE);
   2   1               DEFAULT RANGE(A:H) FLOAT BINARY VALUE(FLOAT BINARY(53)),
                               RANGE(O:Z) FLOAT BINARY VALUE(FLOAT BINARY(53));
   3   1               DCL DATA(*,*);
   4   1               DCL PFILE FILE VARIABLE;
   5   1               NDIM2=DIM(DATA,2);
   6   1               NDIM1=DIM(DATA,1);   NSTVS=(NDIM1+2)/3;
   8   1               NFIELD=120/NSTVS;
   9   1               IF NFIELD>30 THEN NFIELD=30;
  10   1               NDIGITS=14-NSTVS;
  11   1               DO K=1 TO NDIM2;
  12   1   1               PUT FILE(PFILE) SKIP;
  13   1   1               DO I=1 TO 3;
  14   1   12                  PUT FILE(PFILE) SKIP EDIT((DATA(J,K) DO J=I TO NDIM1 BY 3))
                                  (E(NDIGITS+8,NDIGITS),(NSTVS-1) (E(NFIELD,NDIGITS)));
  15   1   12              END;
  16   1   1           END;
  17   1               PUT FILE(PFILE) SKIP;
  18   1               END PRINTM;

1          ROTATE:  PROC(IAX,ANGLE,Z);
   2   1               DEFAULT RANGE(A:H) FLOAT BINARY VALUE(FLOAT BINARY(53));
   3   1               DEFAULT RANGE(O:Z) FLOAT BINARY VALUE(FLOAT BINARY(53));
   4   1               DCL Z(3,*);
   5   1               NVECTS=DIM(Z,2);
   6   1               COSANGLE=COS(ANGLE);   SINANGLE=SIN(ANGLE);
   8   1               JAX=1+MOD(IAX,3);   KAX=1+MOD(JAX,3);
  10   1               DO IVECT=1 TO NVECTS;
  11   1   1               STORE       = COSANGLE*Z(JAX,IVECT)-SINANGLE*Z(KAX,IVECT);
  12   1   1               Z(KAX,IVECT)= SINANGLE*Z(JAX,IVECT)+COSANGLE*Z(KAX,IVECT);
  13   1   1               Z(JAX,IVECT)= STORE;
  14   1   1           END;
  15   1               END ROTATE;

1          SYMETRY: PROC(A);
   2   1               DEFAULT RANGE(A:H) FLOAT BINARY VALUE(FLOAT BINARY(53));
   3   1               DEFAULT RANGE(O:Z) FLOAT BINARY VALUE(FLOAT BINARY(53));
   4   1               DCL(N,M,IROW,JCOL) FIXED BINARY(15);
   5   1               DCL A(*,*);
   6   1               N=DIM(A,1);
   7   1               M=DIM(A,2);
   8   1               IF N>M THEN N=M;
   9   1               DO IROW=1 TO N-1;
  10   1   1               DO JCOL=IROW+1 TO N;
  11   1   12                  AVG=0.5*(A(IROW,JCOL)+A(JCOL,IROW));
  12   1   12                  A(IROW,JCOL)=AVG;
  13   1   12                  A(JCOL,IROW)=AVG;
  14   1   12              END;
  15   1   1           END;
  16   1               END SYMETRY;
```

```
  1              VCOMP:    PROC(V1,X,V2);
  2       1               DEFAULT RANGE(A:H) FLOAT BINARY VALUE(FLOAT BINARY(53)),
          1                       RANGE(O:Z) FLOAT BINARY VALUE(FLOAT BINARY(53));
          1                       /* GIVEN THE COORDINATES OF THE VECTOR (V2-V1) IN A SYSTEM
          1                          WHICH IS NORTH-EAST-DOWN AT V2, (I. E. GIVEN X,Y,Z) AND
          1                          GIVEN THE LATITUDE LONGITUDE ELEVATION OF V1 ---
          1                          THEN COMPUTE THE LATITUDE LONGITUDE ELEVATION OF V2  */
  3       1               DCL (V1,X,V2,VSTORE) (3) FLOAT BIN(53);
  4       1               DCL R0 INITIAL(20901400.0);
  5       1               RE=R0+V1(3);
  6       1               DLONG=ASIN(X(2)/RE/COS(V1(1)));
  7       1               VSTORE(2)=V1(2)+DLONG;
  8       1               YCOMP=SQRT(RE*RE-X(1)*X(1)-X(2)*X(2));
  9       1               VSTORE(3)=YCOMP-R0-X(3);
 10       1               VSTORE(1)=ATAN(TAN(V1(1))/COS(DLONG))+ATAN(X(1),YCOMP);
 11       1               V2=VSTORE;
 12       1               END VCOMP;
  1              XPVMOVE: PROC(V,A,IA,JA);
                                         /* THIS PROC SETS UP A CROSS PRODUCT OPERATOR */
  2       1               DEFAULT RANGE(A:H) FLOAT BINARY VALUE(FLOAT BINARY(53)),
          1                       RANGE(O:Z) FLOAT BINARY VALUE(FLOAT BINARY(53));
  3       1               DCL MTMOVE EXTERNAL ENTRY;
  4       1               DCL T(3,3) INITIAL((9) 0.0);
  5       1               DCL NIS1 INITIAL(1);  DCL NIS3 INITIAL(3);
  7       1               DCL V(3) BIN(53) FLOAT;
  8       1               DCL A(*,*) BIN(53) FLOAT;
  9       1               DO I=1 TO 3 BY 1;
 10       1    1              T(I,I)=0.0;
 11       1    1              J=1+MOD(I,3);  K=1+MOD(J,3);
 13       1    1              T(J,K)=-V(I);
 14       1    1              T(K,J)=+V(I);
 15       1    1          END;
 16       1               CALL MTMOVE(T,NIS1,NIS1,A,IA,JA,NIS3,NIS3);
 17       1               END XPVMOVE;
```

Subroutines for Which Source Listings Are Not Available:

(1) MTMULT (A,B,C,): performs a standard matrix product C=A*B for conformable matrices.

(2) MINV (A,B,DET,EPS): computes the inverse of a square matrix A and its determinant. $B = A^{-1}$; $DET = \|A\|$; if the determinant is less in absolute value then EPS, then A is considered to be singular.

(3) MTIDENT (A,B): allocates a matrix B to be the same size as the matrix A and sets B to the identity matrix.

(4) MTZERO (A,B): allocates a matrix B to be the same size as the matrix A and sets B to the zero matrix.

(5) MTTRANP (A,B): computes the transpose of a matrix A; $B = A^t$.

Measurement Data File

The measurement data file is a sequential file, blocked into logical records, each of which contains 30 double precision floating point quantities. The first three records are "header" records and define parameters and constants used in the filter. The rest of the file contains system input measurements, one record of measurements for each point in time. Two kinds of measurement information are provided in the file: (1) measured quantities and (2) truth-model assumptions. The measured quantities correspond to input data from the IMU and laser tracking systems. The truth-model assumptions provide the actual error of the time varying parameters in the IMU and laser tracking systems. The truth-model assumptions are not necessary to run the filter, are used only to generate performance statistics, and will not be available during an actual survey. In the following description of the records in the file, an asterisk next to a description indicates a truth-model parameter.

Header Record 1

| Word # | Description | Typical Value |
|---|---|---|
| 1 | number of time varying states | 9 |
| 2 | number of time invariant states | 18 |
| 3 | number of tracker measurements | 6 |
| 4 | number of retroreflectors | 3 |
| 5* | time step for generating data | 1 sec. |
| 6 | time spacing between data reading | 1 sec. |
| 7* | maximum time of filtering | 1200 sec. |
| 8 | latitude ⎫ of the origin of the | $\pi/4$ rad. |
| 9 | longitude ⎬ IMU coordinate system | $\pi/4$ rad. |
| 10 | elevation ⎭ | 0 ft. |
| 11 thru 19 | C: the direction cosine matrix which relates the orientation of the tracker assembly with respect to the IMU assembly. In the preferred embodiment: | |
| 20 thru 30 | (The elements are stored by rows.) not used. | |

$$C = \begin{bmatrix} \sqrt{2}/2 & -\sqrt{2}/2 & 0 \\ \sqrt{2}/2 & \sqrt{2}/2 & 0 \\ 0 & 0 & 1 \end{bmatrix}$$

| Header Record 2 (Time Invariant States) | | |
|---|---|---|
| Word # | Description | Units |
| 1* | x accelerometer bias | ft./sec./sec. |
| 2* | y accelerometer bias | ft./sec./sec. |
| 3* | z accelerometer bias | ft./sec./sec. |
| 4* | x accelerometer scale factor error | |
| 5* | y accelerometer scale factor error | |
| 6* | z accelerometer scale factor error | |
| 7* | x gyro drift bias | rad./sec. |
| 8* | y gyro drift bias | rad./sec. |
| 9* | z gyro drift bias | rad./sec. |
| 10* | x tracker assembly error | rad. |
| 11* | y tracker assembly error | rad. |
| 12* | z tracker assembly error | rad. |
| 13* | outer tracker gimbal bias | rad. |
| 14* | inner tracker gimbal bias | rad. |
| 15* | laser range bias | ft. |
| 16* | x IMU gimbal bias | rad. |
| 17* | y IMU gimbal bias | rad. |
| 18* | z IMU gimbal bias | rad. |
| 19 thru 30 not used | | |

| Header Record 3 | | |
|---|---|---|
| Word # | Description | |
| 1-3 | the latitude, longitude, and elevation of the first retroreflector (units are rad., rad., ft.) | |
| 4-6 | coordinates of $2^{nd}$ retro | |
| 7-9 | coordinates of $3^{rd}$ retro; etc. | |

The number of retroreflectors was specified in the 4th word of Header Record 1. If there are more than 10 retroreflectors, successive header records are used, 10 retroreflectors being provided in each record.

| Data Records | | |
|---|---|---|
| Word # | Description | Units |
| 1 | time of measurement | sec. |
| 2 | sequential number of the retroreflector being tracked (0 means that the aircraft is out of sight of all retroreflectors) | |
| 3 | IMU x (north) position | ft. |
| 4 | IMU y (east) position | ft. |
| 5 | IMU z (down) position | ft. |
| 6 | IMU x velocity | ft./sec. |
| 7 | IMU y velocity | ft./sec. |
| 8 | IMU z velocity | ft./sec. |
| 9 | x accelerometer readout | ft./sec./sec. |
| 10 | y accelerometer readout | ft./sec./sec. |
| 11 | z accelerometer readout | ft./sec./sec. |
| 12* thru 20* | the true value of the time-varying errors | |
| 21 | x (outer) IMU gimbal angle | rad. |
| 22 | y (middle) IMU gimbal angle | rad. |
| 23 | z (inner) IMU gimbal angle | rad. |
| 24 | outer tracker gimbal angle | rad. |
| 25 | inner tracker gimbal angle | rad. |
| 26 | laser tracker range | ft. |
| 27 thru 30 | unused | |

Filter Parameters

Most generally, the filter parameters written into the source programs initialize operation of the filter. Provision is made however to override these built-in or default values by providing an input statement having the following syntax:

$NAME_1 = value_1, NAME_2 = value_2, \ldots,$ $NAME_n = value_n;$ where each of the "$NAME_k$" is taken from list of mnemonics provided below and "$value_k$" over-rides the corresponding default value which appears in the source program. The over-rides are separated from each other by a comma and/or one or more blanks. Input is terminated by a semicolon, which must be present even if there are no over-rides.

Some of the default values are taken from Header Record 1, in which case the word # is indicated in the default column.

Note that EHAT (1,1) to EHAT (20,20) describe the twenty errors which this Kalman filter is designed to estimate.

| Mnemonic | Default | Units | Description |
|---|---|---|---|
| RERR | 0.0 | ft. | RMS laser range error |
| AERR | 0.0 | rad. | RMS laser pointing error |
| TMAX* | "word 7" | sec. | maximum time of filtering |
| DTXTRAP | "word 6" | sec. | time step for differential equations |
| DTPLϕT* | 0.0 | sec. | time step for Calcomp plots |
| DTREAD* | "word 6" | sec. | time step for reading measurements |
| DTPRINT* | "word 6" | sec. | time step for printout |
| SIGTHRESH | 3.0 | | bound for printing residuals |
| CCTHRESH | .98 | | bound for printing correlation coefficients among state |

-continued

| Mnemonic | Default | Units | Description |
|---|---|---|---|
| EHAT | The initial value of the square-root of the diagonal elements of the covariance matrix: | | |
| EHAT (1,1) to EHAT (3,3) | 1000 | ft. | IMU position error |
| EHAT (4,4) to EHAT (6,6) | 5 | ft./sec. | IMU velocity error |
| EHAT (7,7) to EHAT (9,9) | .005 | rad. | IMU platform misalignment |
| EHAT (10,10) to EHAT (12,12) | $2.0*10^{-7}$ | rad./sec. | gyro drift bias |
| EHAT (13,13) | .001 | rad. | x-aircraft body axis misalignment |
| EHAT (14,14) | .001 | rad. | y-aircraft body axis misalignment |
| EHAT (15,15) | .0002 | rad. | z-aircraft body axis misalignment |
| EHAT (16,16) to EHAT (18,18) | .001 | ft./sec./sec. | accelerometer bias |
| EHAT (19,19) | .0002 | rad. | tracker inner gimbal bias |
| EHAT (20,20) | 2.0 | ft. | laser range bias |

What is claimed is:

1. An apparatus for surveying ground terrain from an airborne vehicle comprising
an inertial measurement unit carried by said vehicle, said unit having
a stable platform member,
a gimbal support means for supporting said platform and for providing gimbal angle measurements to fully describe the angular orientation of the stable platform relative to a predetermined platform reference direction, said gimbal support means including gimbal drive members,
at least three accelerometers mounted on said stable platform, said accelerometers each providing an accelerometer output signal fully describing the acceleration to which the accelerometer is subjected, said accelerometer output signals together describing the acceleration to which the platform is subjected, and
at least three gyros mounted on said stable platform member and having output signals responsive to deviations of the pltform from a desired platform pointing direction, in a known coordinate system,
means responsive to the outputs of said gyros for driving said gimbal drive members to change the angular position of corresponding gimbals to maintain said stable platform aligned to said desired pointing direction,
a position tracking device carried by said vehicle and providing tracker output signals representative in a predetermined tracker coordinate system, of measured vector distances between the tracking device and a cooperating reflection means on the terrain,
a terrain altimeter carried by said airborne vehicle, said altimeter providing altimeter output signals representative, in a predetermined altimeter coordinate system, of measured vector distances between the altimeter and terrain locations at which the altimeter is directed,
a data processing and control unit carried by said airborne vehicle and connected
to the inertial measurement unit for receiving said accelerometer output signals and said gimbal angle measurements,
to said position tracking device for receiving said tracker output signals, and
to the terrain altimeter for receiving said altimeter output signals, and
said data processing and control unit including
accelerometer data processing means to determine from said accelerometer output signals, a sequence of inertial measurement unit determined vehicle positions representing the position of said airborne vehicle at each of a sequence of known times in said known coordinate system,
tracker data processing means responsive to said tracker output signals and said gimbal angle measurements to determine a sequence of tracker determined vehicle positions representing the position of the airborne vehicle at each of said sequence of known times in said known coordinate system, and
error correction means responsive to said accelerometer data processing means and said tracker data processing means for generating and storing error corrections for a plurality of the operating parameters of the inertial measurment unit and the position tracking device,
whereby said inertial measurement unit determined positions and said tracker determined positions can be corrected in real time.

2. The apparatus of claim 1 wherein said position tracking device comprises a single laser tracker transmitter and an optical receiver for supplying said tracker output signals.

3. The apparatus of claim 2 wherein said transmitter and receiver are coaxial.

4. The apparatus of claim 2 wherein said position tracking device further comprises a tracker servo control means responsive at least to said tracker output signals for providing tracker angle drive control signals to vary the vector orientation of the position tracking device.

5. The apparatus of claim 4 wherein
said data processing and control unit comprises means for generating tracker control signals and
said tracker servo control means is further responsive to the tracker control signals from said data processing and control unit to vary the vector orientation of the position tracking device.

6. The apparatus of claim 4 wherein said tracker output signals comprise a direction indicating portion and a distance indicating portion, and said direction indicating portion is derived from a plurality of angle sensing resolver members which form part of a gimbal supporting structure for pointing said position tracking device.

7. The apparatus of claim 2 wherein said position tracking device further comprises means for suspending said tracking device in a servo controlled, gimbal structure to direct said device towards the cooperating reflection means.

8. The apparatus of claim 7 wherein said suspending means has an outer gimbal of said gimbal structure supported by the airborne vehicle.

9. The apparatus of claim 2 wherein said cooperating reflection means includes a plurality of retroreflectors, each retroreflector having a known positional location on said terrain.

10. The apparatus of claim 9 wherein said retroreflectors number at least three, any three retroreflectors not being positioned along a straight line.

11. The apparatus of claim 1 wherein said control unit operates to generate gyro control signals and
to apply the gyro control signals to the gyros for adjusting them as the coordinate direction of said platform pointing direction in inertial space changes.

12. The apparatus of claim 1 wherein said accelerometer data processing means operates
to bandwidth prefilter said accelerometer output signals to provide filtered accelerometer output signals and
to twice integrate said filtered accelerometer output signals to provide said sequence of inertial measurement unit determined positions.

13. The apparatus of claim 1 wherein said tracker data processing means operates
to prefilter said tracker output signals and said gimbal angle measurements to provide filtered tracker and gimbal output signals at said coincident times, and
to transform said filtered tracker and gimbal output signals to said sequence of tracker determined positions in said known coordinate system.

14. The apparatus of claim 13 wherein said data means further operates to adapt linear curvefitting to said tracker output signals and said gimbal angle measurements to provide said sequence of filtered tracker and gimbal signals at said sequence of times corresponding to the times of said inertial measurement unit determined positions.

15. The apparataus of claim 14 wherein said data means further operates upon said sequence of filtered signals according to a known linear transformation.

16. The apparatus of claim 1 wherein said error correction means operates
in response to the accelerometer data processing means and the tracker data processing means for differencing corresponding measurements of said sequence of inertial measurement unit determined positions and said tracker determined positions to produce a sequence of output difference positions, and
in response to said sequence of difference positions to generate said error corrections therefrom, said data means operating to further bandwidth filter said sequence of difference positions.

17. The apparatus of claim 16 wherein said data means further operates
to perform Kalman filtering upon said sequence of difference positions to generate best estimates of the errors in said plurality of operating parameters of said inertial measurement unit and said position tracking device.

18. The apparatus of claim 16 wherein said data means further operates
to perform batch least-squares error estimation upon said sequence of difference positions to generate best estimates of the errors in said plurality of operating parameters of the inertial measurement unit and the position tracking device.

19. The apparatus of claim 1 wherein the control unit further operates
to generate from the error corrections at least one error correction signal and to apply said correction signal to said inertial measurement unit.

20. The apparatus of claim 2 wherein said cooperating reflection means includes one retroreflector, said retroreflector having a known positional location on said terrain.

21. A surveying method for providing a profile of an area of terrain from an airborne vehicle wherein
the position of each of a number of cooperating reflecting devices on the terrain to be surveyed is precisely determined in a known coordinate system,
an inertial measurement unit having a stable inertial platform is initialized,
said platform is maintained in a fixed orientation in said known coordinate system, and
said airborne vehicle is flown over the terrain to be surveyed, the method comprising the steps of, during the flight of said airborne vehicle,
determining repeatedly the position of said airborne vehicle from data supplied by said inertial measurement unit,
measuring repeatedly using a position tracking device the distance and direction of said airborne vehicle from a said reflecting device during time durations when a said device is within sight of the vehicle,
synchronizing said distance and direction measurements to times coincident with said inertial measurement unit position determinations so that said measurements and said determinations are related to the same time,
determining repeatedly the position of said airborne vehicle in said known coordinate system using said coincident distance and direction measurements,
generating, from said two sequences of vehicle position determinations, a sequence of error corrections for a plurality of the operating parameters of said inertial measurement unit and said position tracking device,
storing said sequence of error corrections,
using said sequence of error corrections to change said position determinations, and
determining repeatedly the altitude of said airborne vehicle above said terrain at said coincident times using a measuring altimeter.

22. The method of claim 21 wherein said position measurements are generated using cooperating reflecting devices not in a straight line.

23. The method of claim 21 wherein said vehicle is out of sight of all said cooperating reflecting devices for at least three minutes.

24. The method of claim 21 wherein the position data collection utilizes a single laser tracker.

25. The method of claim 21 further comprising the step of
determining said sequence of error corrections solely from data supplied by said inertial measurement unit when said vehicle is out of sight of all of the cooperating reflecting devices during a predetermined maximum time.

26. The method of claim 21 further comprising the step of performing a Kalman filtering operation to determine said error corrections.

27. The method of claim 21 further comprising the step of performing a batch least-squares error estimation operation to determine said error corrections.

28. The method of claim 21 further comprising the steps of
repeatedly differencing said inertial measurement unit determined positions and the corresponding tracker determined positions to form a sequence of difference positions, and
utilizing said differences to generate said error corrections.

29. The method of claim 28 further comprising the step of applying a bandwidth filtering procedure to said sequence of difference positions.

30. The method of claim 21 further comprising the step of correcting one said parameter of said inertial measurement unit using at least one of said error corrections.

* * * * *